United States Patent
Fox et al.

(10) Patent No.: US 9,900,478 B2
(45) Date of Patent: Feb. 20, 2018

(54) DEVICE ATTACHMENT WITH INFRARED IMAGING SENSOR

(71) Applicant: FLIR Systems, Inc., Wilsonville, OR (US)

(72) Inventors: Michael Fox, Nashua, NH (US); Mark Nussmeier, Goleta, CA (US); Eric A. Kurth, Santa Barbara, CA (US); Nicholas Högasten, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US); Jeffrey D. Frank, Goleta, GA (US); Andrew C. Teich, Golea, CA (US); Dwight Dumpert, Goleta, CA (US); Gerald W. Blakeley, Goleta, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 770 days.

(21) Appl. No.: 14/281,883

(22) Filed: May 19, 2014

(65) Prior Publication Data
US 2014/0253735 A1 Sep. 11, 2014

Related U.S. Application Data

(63) Continuation-in-part of application No. PCT/US2013/062433, filed on Sep. 27, 2013, which
(Continued)

(51) Int. Cl.
*G01J 5/00* (2006.01)
*G01K 1/00* (2006.01)
(Continued)

(52) U.S. Cl.
CPC ........ *H04N 5/2252* (2013.01); *H04M 1/0254* (2013.01); *H04M 1/0264* (2013.01);
(Continued)

(58) Field of Classification Search
USPC .......................................... 374/121, 124, 208
See application file for complete search history.

(56) References Cited

U.S. PATENT DOCUMENTS

| 6,633,231 B1 | 10/2003 | Okamoto et al. |
| 7,030,599 B2 * | 4/2006 | Douglas ............... G01R 19/155 324/72.5 |

(Continued)

FOREIGN PATENT DOCUMENTS

| CN | 103718541 | 4/2014 |
| WO | WO2007/053329 | 5/2007 |

(Continued)

Primary Examiner — Mirellys Jagan
(74) Attorney, Agent, or Firm — Haynes and Boone, LLP

(57) ABSTRACT

Various techniques are disclosed for providing a device attachment configured to releasably attach to and provide infrared imaging functionality to mobile phones or other portable electronic devices. For example, a device attachment may include a housing with a tub on a rear surface thereof shaped to at least partially receive a user device, an infrared sensor assembly disposed within the housing and configured to capture thermal infrared image data, and a processing module communicatively coupled to the infrared sensor assembly and configured to transmit the thermal infrared image data to the user device. Thermal infrared image data may be captured by the infrared sensor assembly and transmitted to the user device by the processing module in response to a request transmitted by an application program or other software/hardware routines running on the user device.

24 Claims, 31 Drawing Sheets

Related U.S. Application Data is a continuation-in-part of application No. 13/901,428, filed on May 23, 2013, application No. 14/281,883, which is a continuation-in-part of application No. 11/841,036, filed on Aug. 20, 2007, now Pat. No. 8,727,608, which is a continuation-in-part of application No. 11/189,122, filed on Jul. 25, 2005, now Pat. No. 7,452,127, and a continuation-in-part of application No. 11/039,653, filed on Jan. 19, 2005, now Pat. No. 7,168,316, and a continuation-in-part of application No. 10/910,894, filed on Aug. 4, 2004, now Pat. No. 7,163,336, and a continuation-in-part of application No. 10/911,177, filed on Aug. 4, 2004, now Pat. No. 7,111,981, and a continuation-in-part of application No. 10/654,851, filed on Sep. 4, 2003, now Pat. No. 7,056,012.

(60) Provisional application No. 61/880,827, filed on Sep. 20, 2013, provisional application No. 61/792,582, filed on Mar. 15, 2013, provisional application No. 61/748,018, filed on Dec. 31, 2012, provisional application No. 61/746,069, filed on Dec. 26, 2012.

(51) Int. Cl.
| | | |
|---|---|---|
| *H04N 5/225* | (2006.01) | |
| *H04N 5/33* | (2006.01) | |
| *H04M 1/02* | (2006.01) | |
| *H04N 5/232* | (2006.01) | |
| *H04N 5/365* | (2011.01) | |

(52) U.S. Cl.
CPC ......... *H04N 5/23254* (2013.01); *H04N 5/33* (2013.01); *H04N 5/365* (2013.01); *H04N 5/3651* (2013.01)

(56) References Cited

U.S. PATENT DOCUMENTS

| | | | |
|---|---|---|---|
| 7,163,336 B2 * | 1/2007 | Blakeley | G01J 5/02 374/120 |
| 2006/0045504 A1 | 3/2006 | Zarnowski et al. | |
| 2010/0013979 A1 * | 1/2010 | Golub | G01J 3/2803 348/340 |
| 2013/0208761 A1 * | 8/2013 | Mavrides | G01J 5/089 374/121 |
| 2013/0340500 A1 * | 12/2013 | Miller | G01N 25/56 73/29.02 |
| 2014/0098237 A1 * | 4/2014 | Sieh | H04N 5/33 348/164 |
| 2014/0314120 A1 * | 10/2014 | Feyh | G01J 5/505 374/121 |
| 2016/0076936 A1 * | 3/2016 | Schoch | G01J 1/4228 250/349 |
| 2016/0076937 A1 * | 3/2016 | Stuart | G06F 1/163 250/349 |
| 2016/0202427 A1 * | 7/2016 | Smith | G02B 6/3604 385/26 |

FOREIGN PATENT DOCUMENTS

| | | |
|---|---|---|
| WO | WO2012/170941 | 12/2012 |
| WO | WO2012/170954 | 12/2012 |

* cited by examiner

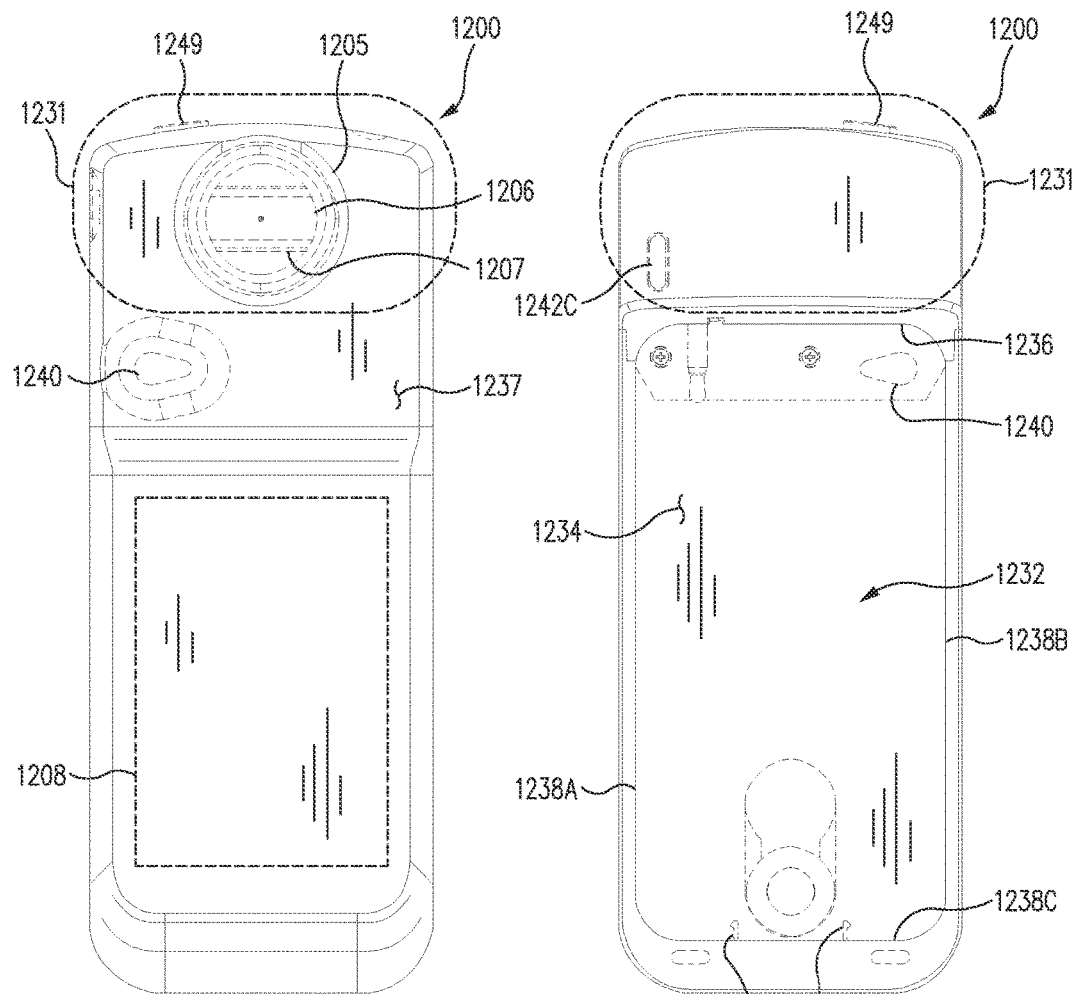

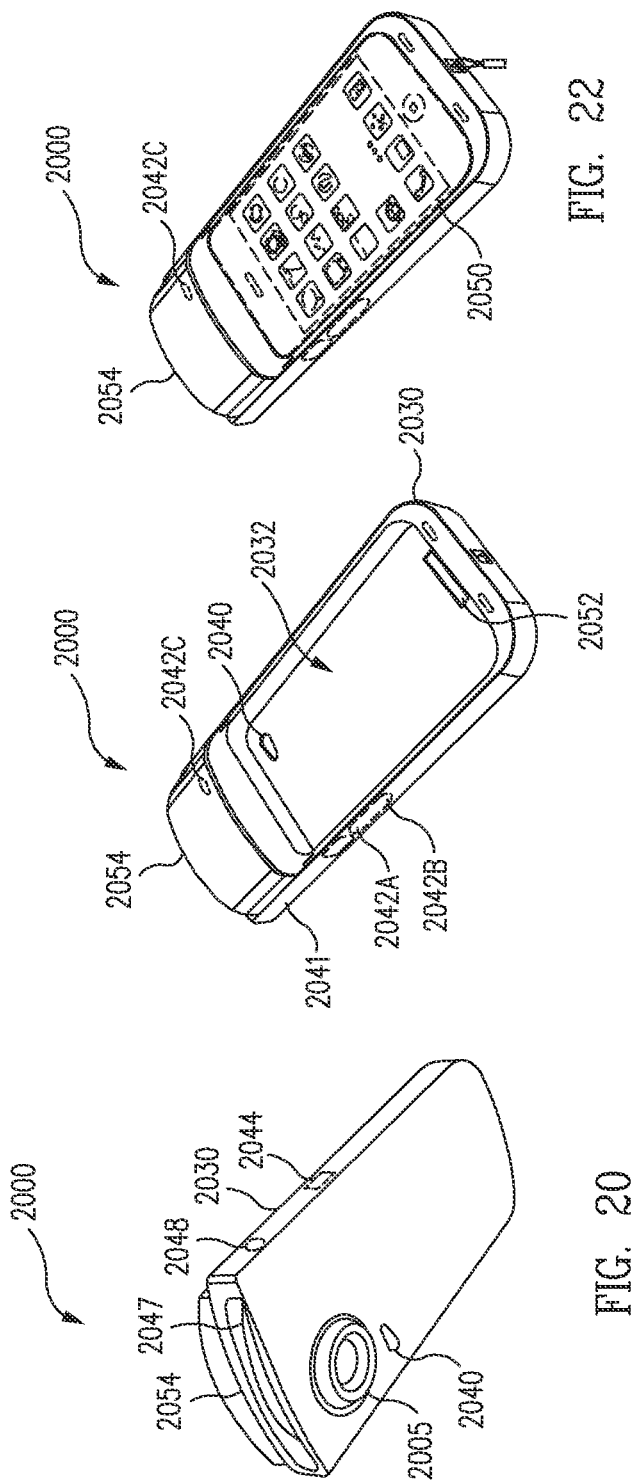

DEVICE ATTACHMENT WITH INFRARED IMAGING SENSOR

CROSS-REFERENCE TO RELATED APPLICATIONS

This application is a continuation-in-part of U.S. patent application Ser. No. 11/841,036 filed Aug. 20, 2007 issued as U.S. Pat. No. 8,727,608 on May 20, 2014 and entitled "MOISTURE METER WITH NON-CONTACT INFRARED THERMOMETER," which is hereby incorporated by reference in its entirety.

U.S. patent application Ser. No. 11/841,036 is a continuation-in-part of U.S. patent application Ser. No. 11/189,122 filed Jul. 25, 2005 issued as U.S. Pat. No. 7,452,127 on Nov. 18, 2008 and entitled "ANEMOMETER WITH NON-CONTACT TEMPERATURE MEASUREMENT," which is hereby incorporated by reference in its entirety.

U.S. patent application Ser. No. 11/841,036 is also a continuation-in-part of U.S. patent application Ser. No. 11/039,653 filed Jan. 19, 2005 issued as U.S. Pat. No. 7,168,316 on Jan. 30, 2007 and entitled "HUMIDITY METER WITH NON-CONTACT TEMPERATURE MEASUREMENT," which is hereby incorporated by reference in its entirety.

U.S. patent application Ser. No. 11/841,036 is also a continuation-in-part of U.S. patent application Ser. No. 10/910,894 filed Aug. 4, 2004 issued as U.S. Pat. No. 7,163,336 on Jan. 16, 2007 and entitled "INSTRUMENT FOR NON-CONTACT INFRARED TEMPERATURE MEASUREMENT HAVING CURRENT CLAMP METER FUNCTIONS," which is hereby incorporated by reference in its entirety.

U.S. patent application Ser. No. 11/841,036 is also a continuation-in-part of U.S. patent application Ser. No. 10/911,177 filed Aug. 4, 2004 issued as U.S. Pat. No. 7,111,981 on Sep. 26, 2006 and entitled "INSTRUMENT FOR NON-CONTACT INFRARED TEMPERATURE MEASUREMENT COMBINED WITH TACHOMETER FUNCTIONS," which is hereby incorporated by reference in its entirety.

U.S. patent application Ser. No. 11/841,036 is also a continuation-in-part of U.S. patent application Ser. No. 10/654,851 filed Sep. 4, 2003 issued as U.S. Pat. No. 7,056,012 on Jun. 6, 2006 and entitled "MULTIMETER WITH NON-CONTACT TEMPERATURE MEASUREMENT," which is hereby incorporated by reference in its entirety.

This application claims the benefit of U.S. Provisional Patent Application No. 61/938,388 filed Feb. 11, 2014 and entitled "MEASUREMENT DEVICE WITH THERMAL IMAGING CAPABILITIES AND RELATED METHODS," which is hereby incorporated by reference in its entirety.

This application is also a continuation-in-part of U.S. patent application Ser. No. 14/034,493 filed Sep. 23, 2013 and entitled "MEASUREMENT DEVICE FOR ELECTRICAL INSTALLATIONS AND RELATED METHODS," which is hereby incorporated by reference in its entirety.

U.S. patent application Ser. No. 14/034,493 is a continuation-in-part of International Patent Application No. PCT/US13/059831 filed Sep. 13, 2013 and entitled "MEASUREMENT DEVICE FOR ELECTRICAL INSTALLATIONS AND RELATED METHODS," which is hereby incorporated by reference in its entirety.

International Patent Application No. PCT/U.S. Ser. No. 13/059,831 claims the benefit of U.S. Provisional Patent Application No. 61/701,292 filed Sep. 14, 2012 and entitled "MEASUREMENT DEVICE FOR ELECTRICAL INSTALLATIONS AND RELATED METHODS," which is hereby incorporated by reference in its entirety.

International Patent Application No. PCT/US13/059831 also claims the benefit of U.S. Provisional Patent Application No. 61/748,018 filed Dec. 31, 2012 and entitled "COMPACT MULTI-SPECTRUM IMAGING WITH FUSION," which is hereby incorporated by reference in its entirety.

This application is also a continuation-in-part of International Patent Application No. PCT/US2013/062433 filed Sep. 27, 2013 and entitled "DEVICE ATTACHMENT WITH INFRARED IMAGING SENSOR," which is hereby incorporated by reference in its entirety.

International Patent Application No. PCT/US2013/062433 claims the benefit of U.S. Provisional Patent Application No. 61/880,827 filed Sep. 20, 2013 and entitled "DEVICE ATTACHMENT WITH INFRARED IMAGING SENSOR," which is hereby incorporated by reference in its entirety.

International Patent Application No. PCT/US2013/062433 is a continuation-in-part of U.S. patent application Ser. No. 13/901,428 filed May 23, 2013 and entitled "DEVICE ATTACHMENT WITH INFRARED IMAGING SENSOR," which is hereby incorporated by reference in its entirety.

This application is also a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No, PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is also a continuation-in-part of U.S. patent application Ser. No. 14/099,818 filed Dec. 6, 2013 and entitled "NON-UNIFORMITY CORRECTION TECH- NIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is also a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This patent application is also a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

This application is also a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This application is a continuation-in-part of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

This application is also a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This application is also a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793, 952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to infrared imaging devices and more particularly, for example, to infrared imaging devices for portable equipments and, for example, to systems and methods for multi-spectrum imaging using infrared imaging devices.

BACKGROUND

Various types of portable electronic devices, such as smart phones, cell phones, tablet devices, portable media players, portable game devices, digital cameras, and laptop computers, are in widespread use. These devices typically include a visible-light image sensor or camera that allows users to take a still picture or a video clip. One of the reasons for the increasing popularity of such embedded cameras may be the ubiquitous nature of mobile phones and other portable electronic devices. That is, because users may already be carrying mobile phones and other portable electronic devices, such embedded cameras are always at hand when users need one. Another reason for the increasing popularity may be the increasing processing power, storage capacity, and/or display capability that allow sufficiently fast capturing, processing, and storage of large, high quality images using mobile phones and other portable electronic devices.

However, image sensors used in these portable electronic devices are typically CCD-based or CMOS-based sensors limited to capturing visible light images. As such, these sensors may at best detect only a very limited range of visible light or wavelengths close to visible light (e.g., near infrared light when objects are actively illuminated with infrared light). In contrast, true infrared image sensors can capture images of thermal energy radiation emitted from all objects having a temperature above absolute zero, and thus can be used to produce infrared images (e.g., thermograms) that can be beneficially used in a variety of situations, including viewing in a low or no light condition, detecting body temperature anomalies in people (e.g., for detecting illness), detecting invisible gases, inspecting structures for water leaks and damaged insulation, detecting electrical and mechanical equipment for unseen damages, and other situations where true infrared images may provide useful information. Even though mobile phones and other portable electronic devices capable of processing, displaying, and storing infrared images are in widespread daily use, these devices are not being utilized for infrared imaging due to a lack of a true infrared imaging sensor.

SUMMARY

Various techniques are disclosed for providing a device attachment configured to releasably attach to and provide infrared imaging functionality to mobile phones or other portable electronic devices. For example, a device attachment may include a housing with a partial enclosure (e.g., a tub or cutout) on a rear surface thereof shaped to at least partially receive a user device, an infrared sensor assembly disposed within the housing and configured to capture thermal infrared image data, and a processing module communicatively coupled to the infrared sensor assembly and configured to transmit the thermal infrared image data to the user device. Thermal infrared image data may be captured by the infrared sensor assembly and transmitted to the user device by the processing module in response to a request transmitted by an application program or other software/hardware routines running on the user device. The thermal infrared image data may be transmitted to the user device via a device connector or a wireless connection.

In one embodiment, a device attachment includes a housing configured to releasably attach to a user device; an infrared sensor assembly within the housing, the infrared sensor assembly configured to capture thermal infrared image data; and a processing module communicatively coupled to the infrared sensor assembly and configured to transmit the thermal infrared image data to the user device.

In another embodiment, a method of providing infrared imaging functionality for a user device includes releasably attaching to the user device a device attachment comprising an infrared sensor assembly and a processing module; capturing thermal infrared image data at the infrared sensor assembly; and transmitting the thermal infrared image data to the user device using the processing module.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 14 illustrates a front elevational view of a device attachment having an infrared sensor assembly in accordance with an embodiment of the disclosure.

FIG. 15 illustrates a rear elevational view of a device attachment having an infrared sensor assembly in accordance with an embodiment of the disclosure.

FIG. 20 illustrates a front-left-top perspective view of a device attachment having an infrared sensor assembly in accordance with another embodiment of the disclosure.

FIG. 21 illustrates a rear-left-bottom perspective view of a device attachment having an infrared sensor assembly in accordance with another embodiment of the disclosure.

FIG. 22 illustrates a rear view of a device attachment having an infrared sensor assembly, showing a user device releasably attached thereto in accordance with another embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
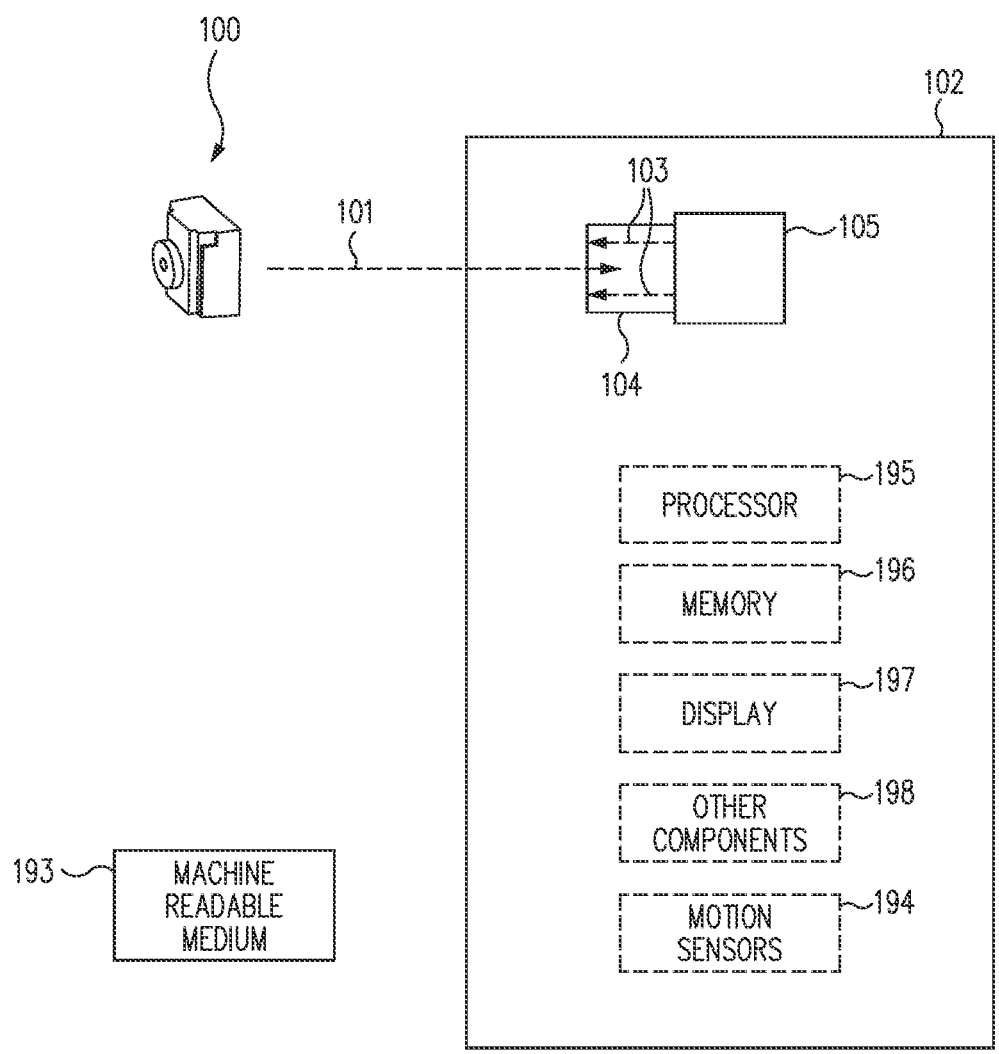
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device (e.g., any type of mobile personal electronic device). In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
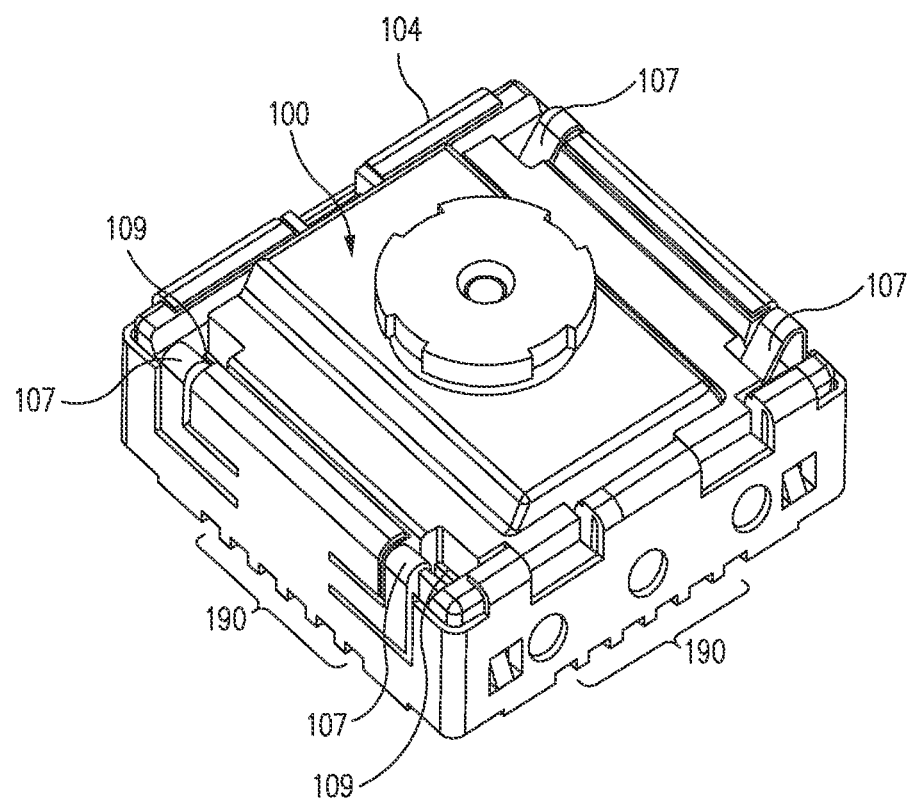
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
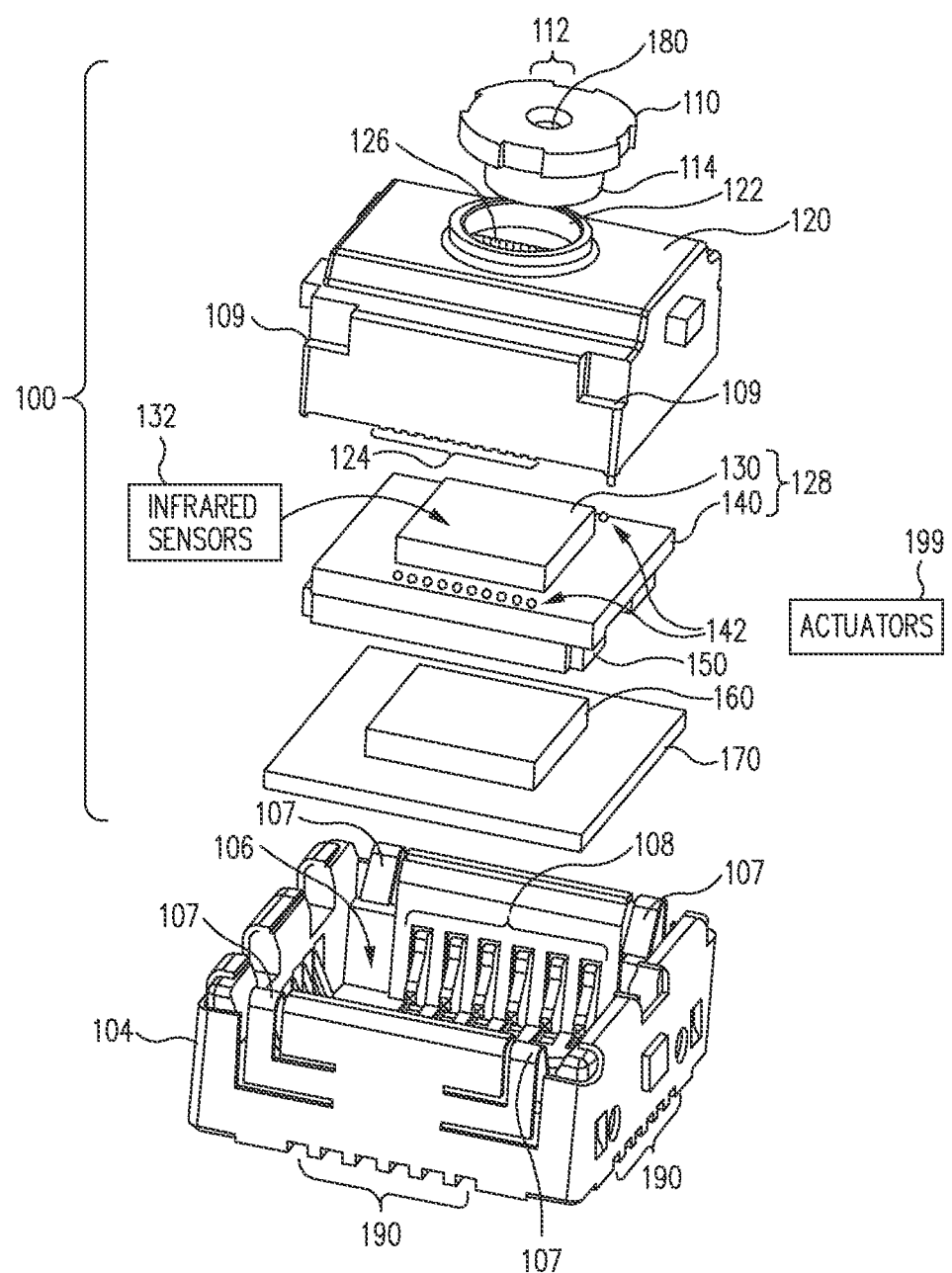
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROTC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROTC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
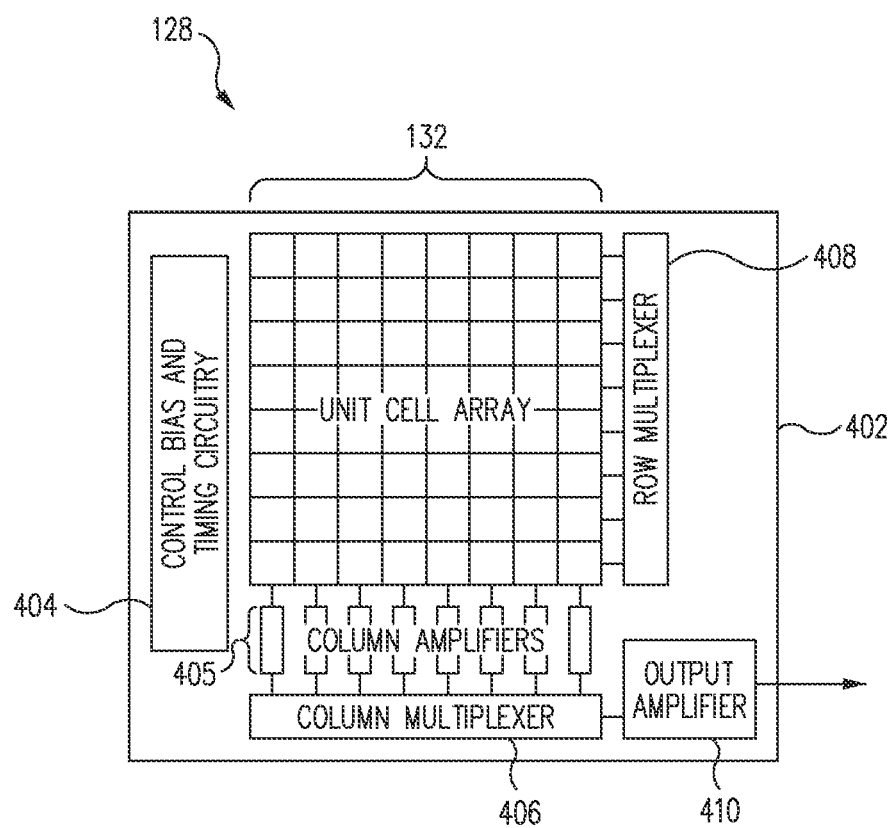
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROTC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROTC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (HAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
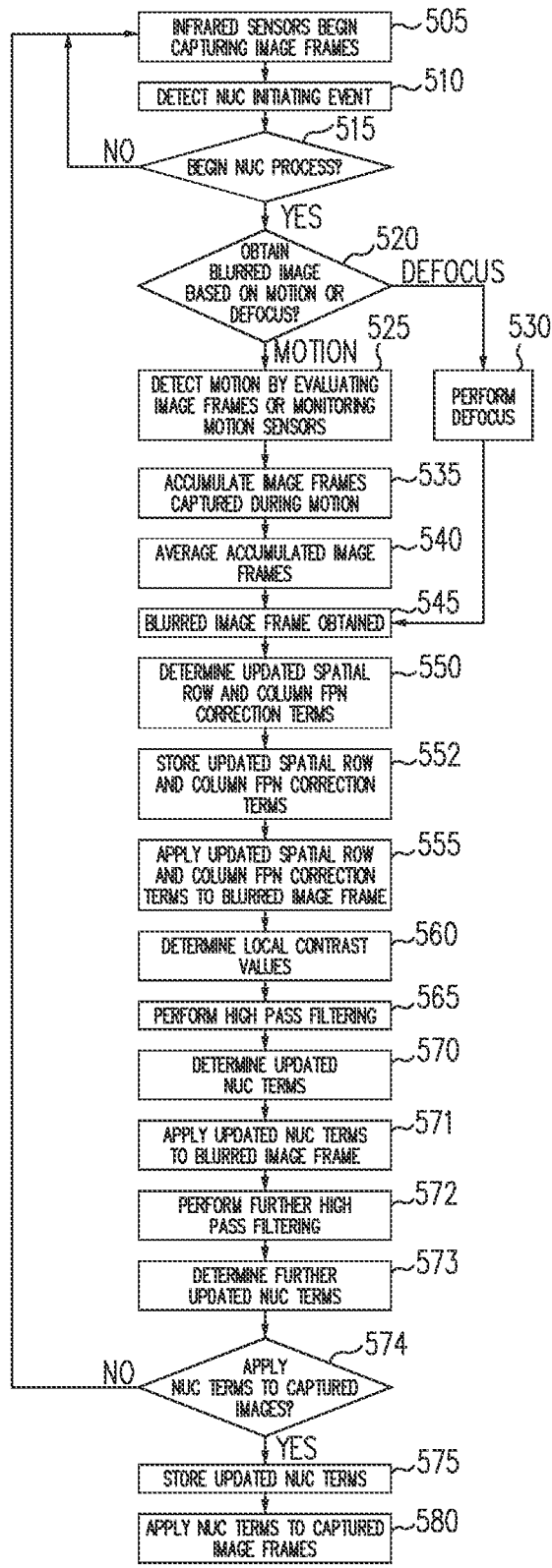
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROTC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
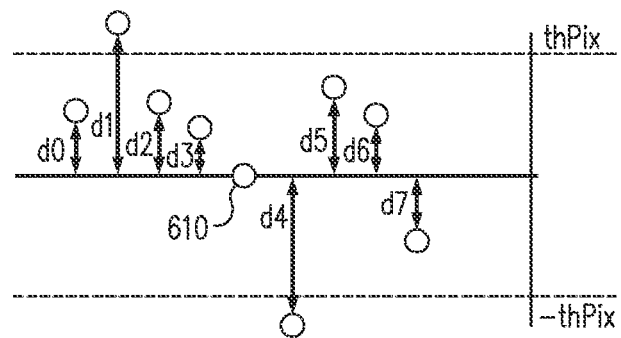
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination of (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
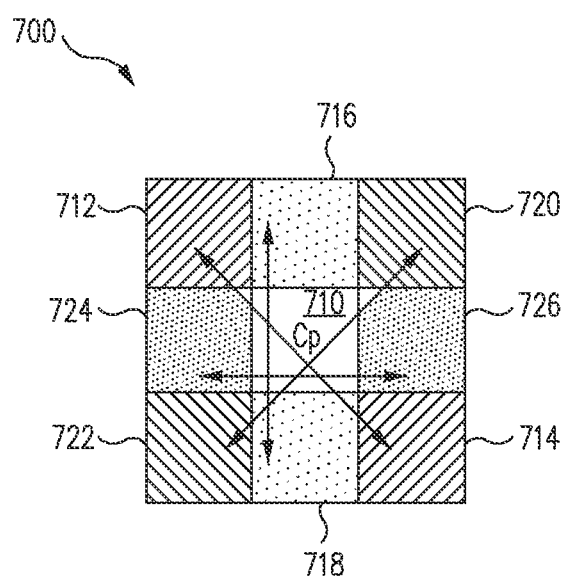
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
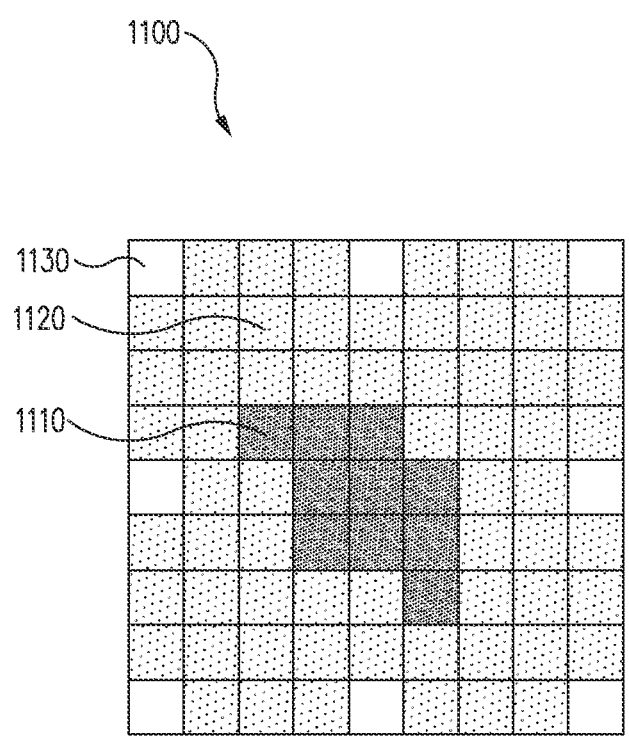
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
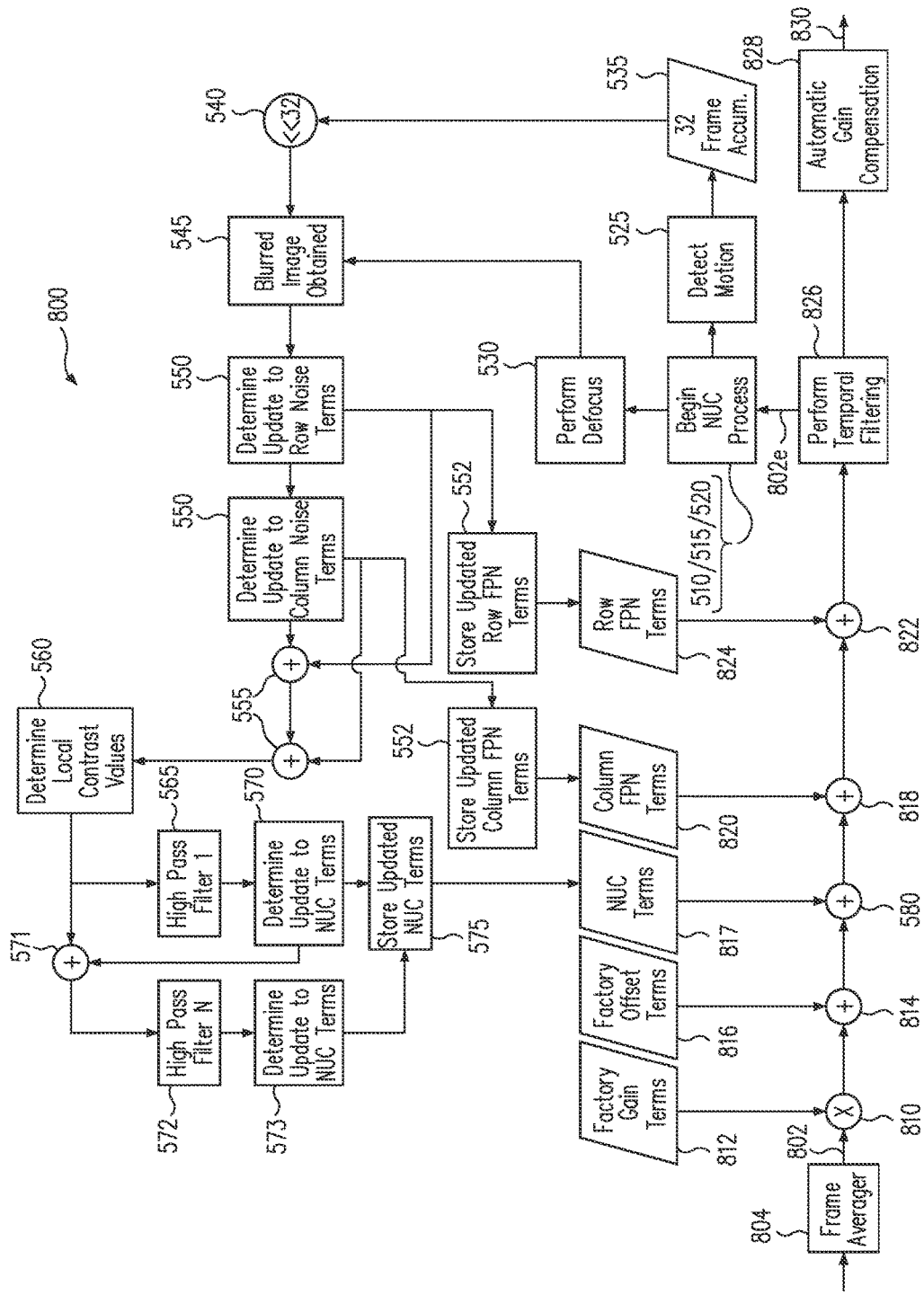
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROTC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
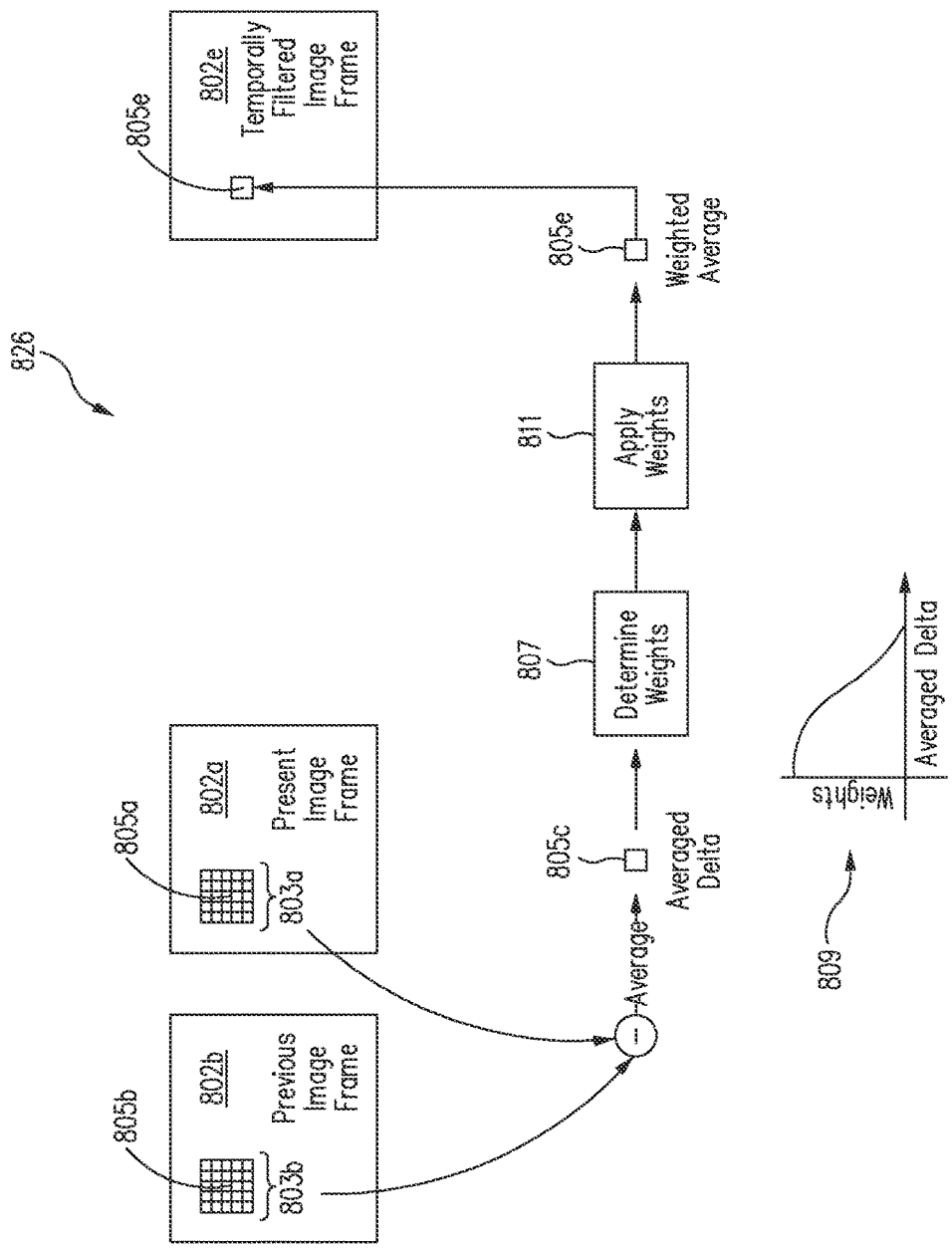
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
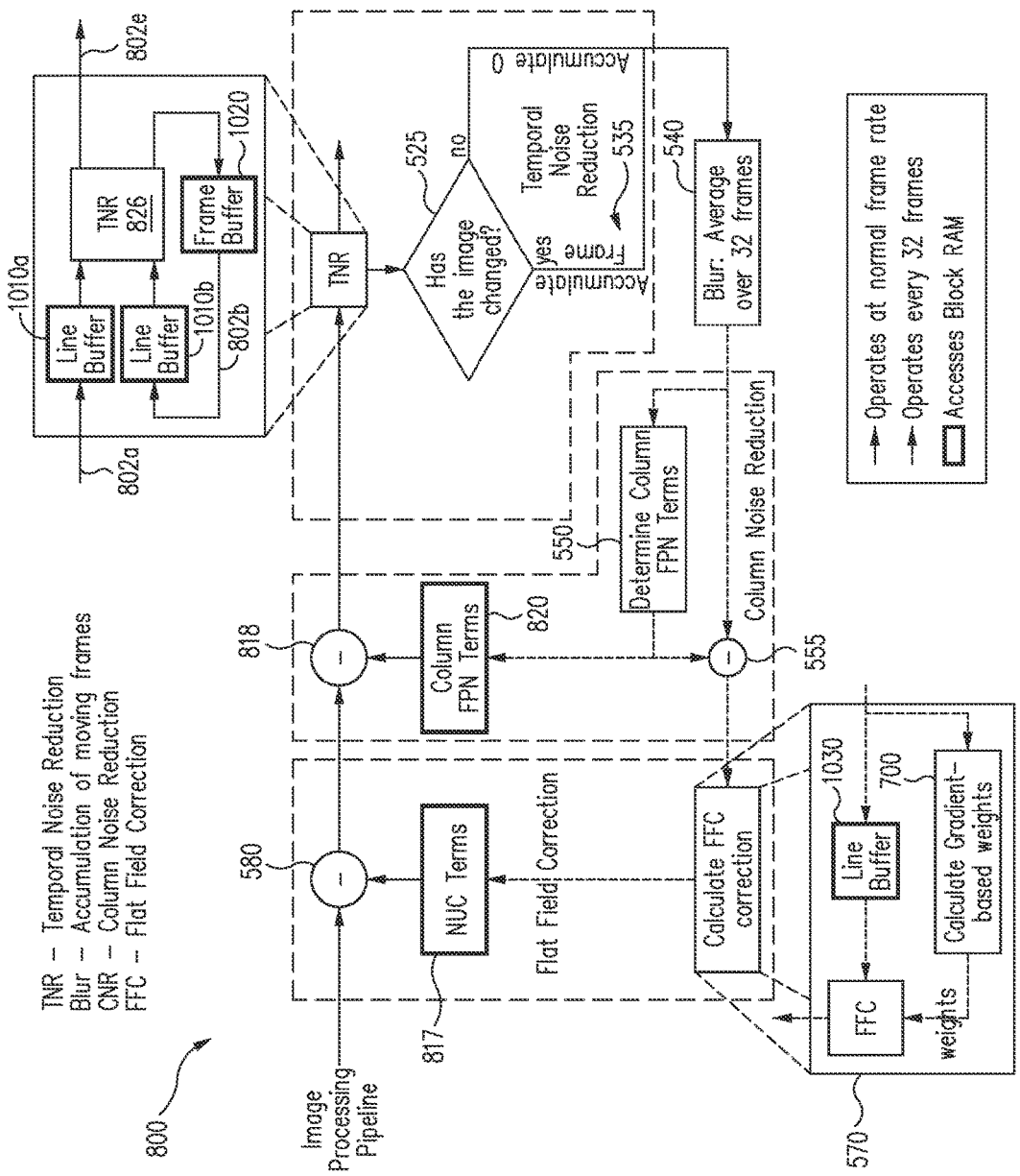
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments.

Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
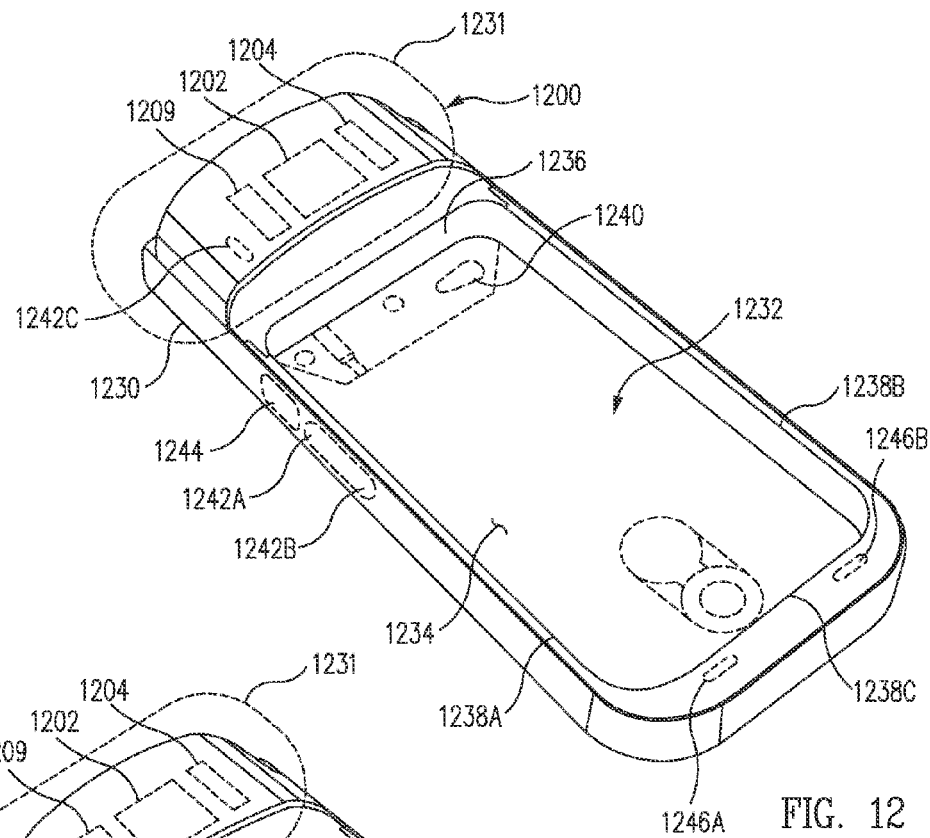
FIG. 12 illustrates a rear-left-bottom perspective view of a device attachment having an infrared sensor assembly in accordance with an embodiment of the disclosure.
Figure 13:
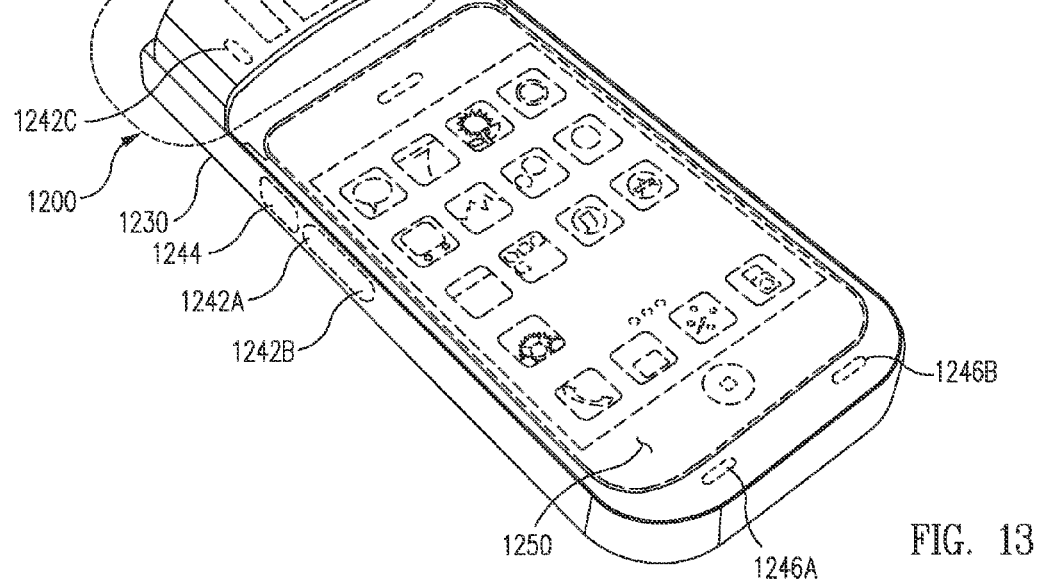
FIG. 13 illustrates a rear-left-bottom perspective view of a device attachment having an infrared sensor assembly, showing a user device releasably attached thereto in accordance with an embodiment of the disclosure.
Figure 16:
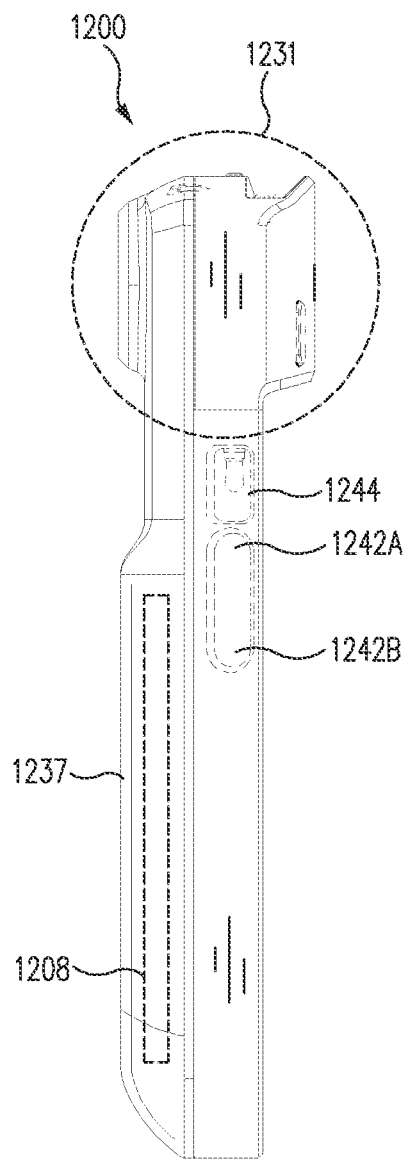
FIG. 16 illustrates a left side elevational view of a device attachment having an infrared sensor assembly in accordance with an embodiment of the disclosure.
Figure 17:
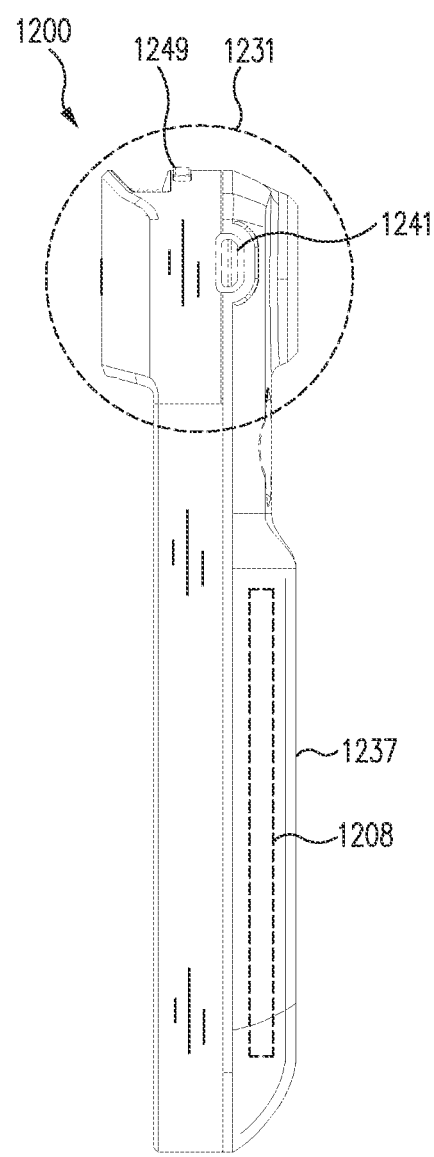
FIG. 17 illustrates a right side elevational view of a device attachment having an infrared sensor assembly in accordance with an embodiment of the disclosure.
Figure 18:
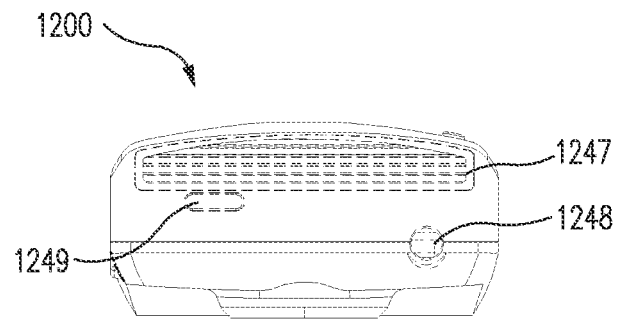
FIG. 18 illustrates a top plan view of a device attachment having an infrared sensor assembly in accordance with an embodiment of the disclosure.
Figure 19:
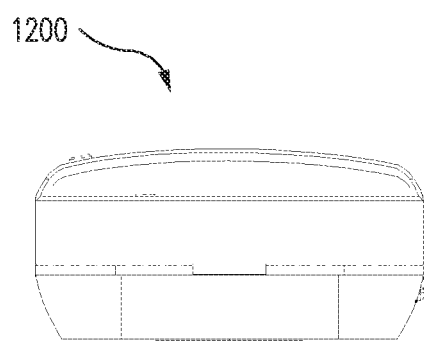
FIG. 19 illustrates a bottom plan view of a device attachment having an infrared sensor assembly in accordance with an embodiment of the disclosure.

Referring now to FIGS. 12 to 19, various views are shown of a device attachment 1200 having an infrared sensor assembly 1202 in accordance with an embodiment of the disclosure. FIG. 12 is a rear-left-bottom perspective view of device attachment 1200, and FIG. 13 is a rear-left-bottom perspective view of device attachment 1200 and illustrates a user device 1250 releasably attached thereto, in accordance with an embodiment of the disclosure.

User device 1250 may be any type of portable electronic device that provides all or some of the functionality of host device 102 of FIG. 1. User device 1250 may be any type of portable electronic device that may be configured to communicate with device attachment 1200 to receive infrared images captured by infrared sensor assembly 1202. For example, user device 1250 may be a smart phone (e.g., iPhone™ devices from Apple, Inc., Blackberry™ devices from Research in Motion, Ltd., Android™ phones from various manufacturers, or other similar mobile phones), a cell phone with some processing capability, a personal digital assistant (PDA) device, a tablet device (e.g., iPad™ from Apple, Inc., Galaxy Tab™ from Samsung Electronics, Ltd., or other similar portable electronic devices in a tablet folly), a portable video game device (e.g., PlayStation PSP™ from Sony Computer Entertainment Corp., Nintendo DS™ from Nintendo, Ltd.), a portable media player (e.g., iPod Touch™ from Apple, Inc.), a laptop or portable computer, a digital camera, a camcorder, or a digital video recorder.

Device attachment 1200 may include a housing 1230 for releasably attaching to user device 1250. In this regard, housing 1230 may comprise a tub 1232 (e.g., also referred to as a basin or recess) formed on a rear surface thereof and defined by a recessed rear wall 1234, an inner wall 1236, and side walls 1238A-1238C. Tub 1232 may be shaped to at least partially receive user device 1250, such that at least a portion of user device 1250 may be fittingly inserted into tub 1232 as shown in FIG. 13. In another embodiment, one or more of sidewalls 1238A-1238C and inner wall 1236 may be pliable and comprise cantilevered top edges that extend toward the center of tub 1232, such that the cantilevered edges cover a portion of the front side of user device 1250 when inserted into tub 1232. In another embodiment, recessed rear wall 1234 may be hingedly attached to housing 1230, such that recessed rear wall 1234 may be lifted open to provide access to, for example, a battery compartment.

When fittingly inserted into tub 1232, user device 1250 may be securely yet removably attached to device attachment 1200. In this regard, in some embodiments, housing 1230 may also comprise an engagement mechanism 1233 (e.g., a connector plug with a latch that releasably engages a connector receptacle or socket of user device 1250, a hook that releasably engages a connector receptacle of user device 1250, or other engagement mechanisms that releasably engage any suitable part of user device 1250 to aids in securing user device 1250 in place) for added security, as shown in FIG. 15 illustrating a rear view of device attachment 1200.

In various other embodiments, the device attachment 1200 may releasably attach to user device 1250 in any other suitable manner, instead of receiving user device 1250 in tub 1232 or similar structures. For example, the device attachment 1200 may be clipped on, clamped on, or otherwise releasably attach to one of the sides of user device 1250 (e.g., the top side of user device 1250) via a clamp or similar fastening mechanism. In another example, the device attachment 1200 may releasably attach to user device 1250 via a connector plug comprising a latch that releasably engages a connector receptacle of device 1250.

Because access to some features of user device 1250, such as various buttons, switches, connectors, cameras, speakers, and microphones, may be obstructed by housing 1230 when user device 1250 is attached, device attachment 1200 may comprise various replicated components and/or cutouts to allow users to access such features. For example, device attachment 1200 may comprise a camera cutout 1240, replicated buttons 1242A-1242C, a switch cutout 1244, replicated microphone and speaker 1246A-1246B, and/or replicated earphone/microphone jack 1248. Various components of device attachment 1200 may be configured to relay signals between replicated components and user device 1250 (e.g., relay audio signals from user device 1250 to replicated speaker 1246B, relay button depression signals from replicated buttons 1242A-1242C to user device 1250). In some embodiments, cutouts and/or flexible cups (e.g., to allow users to press the buttons underneath) may be used instead of replicating buttons, switches, speakers, and/or microphones.

The location, the number, and the type of replicated components and/or cutouts may be specific to user device 1250, and the various replicated components and cutouts may be implemented or not as desired for particular applications of device attachment 1200. It will be appreciated that replicated components and/or cutouts may also be implemented as desired in other embodiments of the device attachment that do not comprise tub 1232 or similar structures for attaching to user device 1250.

Device attachment 1200 may comprise infrared sensor assembly 1202 disposed within housing 1230 in a main portion 1231 thereof. Main portion 1231 may house internal components of device attachment 1200, and in one embodiment, may be placed above inner wall 1236 in the top portion of housing 1230. Infrared sensor assembly 1202 may be implemented in the same or similar manner as infrared sensor assembly 128 of FIG. 4. For example, infrared sensor assembly 1202 may include an FPA and an ROIC implemented in accordance with various embodiments disclosed herein. Thus, infrared sensor assembly 1202 may capture infrared image data (e.g., thermal infrared image data) and provide such data from its ROIC at various frame rates.

Infrared image data captured by infrared sensor assembly 1202 may be provided to processing module 1204 for further processing. Processing module 1204 may be implemented in the same or similar manner as processing module 160 described herein. In one embodiment, processing module 1204 may be electrically connected to infrared sensor assembly 1202 in the various manners described herein with respect to infrared sensor assembly 128, processing module 160, and infrared imaging module 100. Thus, in one embodiment, infrared sensor assembly 1202 and processing module 1204 may be electrically connected to each other and packaged together to form an infrared imaging module (e.g., infrared imaging module 100) as described herein. In other embodiments, infrared sensor assembly 1202 and processing module 1204 may be electrically and/or communicatively coupled to each other within housing 1230 in other appropriate manners, including, but not limited to, in a multi-chip module (MCM) and other small-scale printed circuit boards (PCBs) communicating via PCB traces or a bus.

Processing module 1204 may be configured to perform appropriate processing of captured infrared image data, and transmit raw and/or processed infrared image data to user device 1250. For example, when device attachment 1200 is attached to user device 1250, processing module 1204 may transmit raw and/or processed infrared image data to user device 1250 via a wired device connector or wirelessly via appropriate wireless components further described herein. Thus, for example, user device 1250 may be appropriately configured to receive the infrared image data from processing module 1204 to display user-viewable infrared images (e.g., thermograms) to users and permit users to store infrared image data and/or user-viewable infrared images. That is, user device 1250 may be configured to run appropriate software instructions (e.g., a smart phone software application, also referred to as an "app") to function as an infrared camera that permits users to frame and take infrared still images, videos, or both. Device attachment 1200 and user device 1250 may be configured to perform other infrared imaging functionalities, such as storing and/or analyzing thermographic data (e.g., temperature information) contained within infrared image data.

In this regard, various infrared image processing operations may be performed by processing module 1204, a processor of user device 1250, or both in a coordinated manner. For example, conversion of infrared image data into user-viewable images may be performed by converting the thermal data (e.g., temperature data) contained in the infrared image data into gray-scaled or color-scaled pixels to construct images that can be viewed by a person. User-viewable images may optionally include a legend or scale that indicates the approximate temperature of corresponding pixel color and/or intensity. Such a conversion operation may be performed by processing module 1204 before transmitting fully converted user-viewable images to user device 1250, by a processor of user device 1250 after receiving infrared image data, by processing module 1208 performing some steps and a processor of user device 1250 performing the remaining steps, or by both processing module 1204 and a processor of user device 1250 in a concurrent manner (e.g., parallel processing). Similarly, various NUC processes described herein may be performed by processing module 1208, a processor of user device 1250, or both in a coordinated manner. Moreover, various other components of user device 1250 and device attachment 1200 may be used to perform various NUC processes described herein. For example, if user device 1250 is equipped with motion sensors, they may be used to detect an NUC process initiating event as described in connection with FIGS. 5 and 8.

Processing module 1204 may be configured to transmit raw and/or processed infrared image data to user device 1250 in response to a request transmitted from user device 1250. For example, an app or other software/hardware routines running on user device 1250 may be configured to request transmission of infrared image data when the app is launched and ready to display user-viewable images on a display for users to frame and take infrared still or video shots. Processing module 1204 may initiate transmission of infrared image data captured by infrared sensor assembly 1202 when the request from the app on user device 1250 is received via wired connection (e.g., through a device connector) or wireless connection. In another embodiment, an app or other software/hardware routines on user device 1250 may request infrared image data when a user takes a still and/or video shot, but use visible-light image data captured by a visible-light camera that may be present on user device 1250 to present images for framing before the user takes a shot. In yet another embodiment, an app or other software/hardware routines may use infrared image data to present images for framing, but permit users to take visible-light still and/or video shots (e.g., to allow framing of visible light flash photography in a low or no light condition).

Device attachment 1200 may include a programmable button 1249 disposed at an accessible location (e.g., on the top side surface) of housing 1230. Programmable button 1249 may be used, for example, by an app or other software/hardware routines on user device 1250 to provide a shortcut to a specific function or functions as desired for the app, such as to launch the app for infrared imaging or as a "shutter button" that users can press to take a still or video shot. Processing module 1204 may be configured to detect a depression of programmable button 1249, and relay the detected button depression to user device 1250.

Device attachment 1200 may include a lens assembly 1205 disposed, for example, on a front side surface 1237 of housing 1230 in main portion 1231. In other embodiments, lens assembly 1205 may be disposed on housing 1230 at any other location suitable for providing an aperture for infrared radiation to reach infrared sensor array 1202. Lens assembly 1205 may comprise a lens 1206 that may be made from appropriate materials (e.g., polymers or infrared transmitting materials such as silicon, germanium, zinc selenide, or chalcogenide glasses) and configured to pass infrared radiation through to infrared sensor assembly. Lens assembly 1205 may also comprise a shutter 1207 implemented in the same or similar manner as shutter 105 of host device 102. In some embodiments, lens assembly 1205 may include other optical elements, such as infrared-transmissive prisms, infrared-reflective mirrors, and infrared filters, as desired for various applications of device attachment 1200. For example, lens assembly 1205 may include one or more filters adapted to pass infrared radiation of certain wavelengths but substantially block off others (e.g., short-wave infrared (SWIR) filters, mid-wave infrared (MWIR) filters, long-wave infrared (LWIR) filters, and narrow-band filters). Such filters may be utilized to tailor infrared sensor assembly 1202 for increased sensitivity to a desired band of infrared wavelengths.

Device attachment 1200 may also include a battery 1208 disposed, for example, within housing 1230 between recessed rear wall 1234 and a front side surface 1237. In other embodiments, battery 1208 may be disposed at any other suitable location, including main portion 1231 of housing 1230, that provides room for housing battery 1208. Battery 1208 may be configured to be used as a power source for internal components (e.g., infrared sensor assembly 1202, processing module 1204) of device attachment 1200, so that device attachment 1200 does not drain the battery of user device 1250 when attached. Further, battery 1208 may be configured to provide electrical power to user device 1250, for example, through a device connector. Thus, battery 1208 may beneficially provide a backup power for user device 1250 to run and charge from. Conversely, various components of device attachment 1200 may be configured to use electrical power from the battery of user device 1200 (e.g., through a device connector), if a user desires to use functionalities of device attachment 1200 even when battery 1208 is drained.

Battery 1208 may be implemented as a rechargeable battery using a suitable technology (e.g., nickel cadmium (NiCd), nickel metal hydride (NiMH), lithium ion (Li-ion), or lithium ion polymer (LiPo) rechargeable batteries). In this regard, device attachment 1200 may include a power socket 1241 for connecting to (e.g., through a cable or wire) and receiving electrical power from an external power source (e.g., AC power outlet, DC power adapter, or other similar appropriate power sources) for charging battery 1208 and/or powering internal components of device attachment 1200.

In some embodiments, device attachment 1200 may also accept standard size batteries that are widely available and can be obtained conveniently when batteries run out, so that users can keep using device attachment 1200 and/or user device 1250 by simply purchasing and installing standard batteries even when users do not have an appropriate battery charger or DC power adapter at hand. As described above, recessed inner wall 1234 or other part of housing 1230 may be hinged and/or removable to remove/install batteries.

As described above, device attachment 1200 may include a device connector (e.g., implemented in some embodiments in the same or similar manner as device connector plug 2052 of FIG. 21 further described herein) that carries various signals and electrical power to and from user device 1250 when attached. The device connector may be disposed at a location that is suitably aligned with the corresponding device connector receptacle or socket of user device 1250, so that the device connector can engage the corresponding device connector receptacle or socket of user device 1250 when device attachment 1200 is attached to user device 1250. For example, if user device 1250 is equipped with a connector receptacle on its bottom side surface, the device connector may be positioned at an appropriate location on side wall 1238C. As described in connection with engagement mechanism 1233, the device connector may also include a mechanical fixture (e.g., a locking/latched connector plug) used to support and/or align user device.

The device connector may be implemented according to the connector specification associated with the type of user device 1250. For example, the device connector may implement a proprietary connector (e.g., an Apple® dock connector for iPod™ and iPhone™ such as a "Lightning" connector, a 30-pin connector, or others) or a standardized connector (e.g., various versions of Universal Serial Bus (USB) connectors, Portable Digital Media Interface (PDMI), or other standard connectors as provided in user devices).

In one embodiment, the device connector may be interchangeably provided, so that device attachment 1200 may accommodate different types of user devices that accept different device connectors. For example, various types of device connector plugs may be provided and configured to be attached to a base connector on housing 1230, so that a connector plug that is compatible with user device 1250 can be attached to the base connector before attaching device attachment 1200 to user device 1250. In another embodiment, the device connector may be fixedly provided.

In some embodiments, another device connector may be implemented on housing 1230 to provide a connection to other external devices. For example, power socket 1241 may also serve as a connector that enables communication to and from (e.g., via an appropriate cable or wire) an external device such as a desktop computer or other devices not attached to device attachment 1200, thus allowing device attachment 1250 to be used as an infrared imaging accessory for an external device as well. Also, if desired, power socket 1241 may be used to connect to user device 1250 as an alternative way of connecting device attachment to user device 1250.

Device attachment 1200 may also communicate with user device 1250 via a wireless connection. In this regard, device attachment 1200 may include a wireless communication module 1209 configured to facilitate wireless communication between user device 1250 and processing module 1204 or other components of device attachment 1200. In various embodiments, wireless communication module 1209 may support the IEEE 802.11. WiFi standards, the Bluetooth™ standard, the ZigBee™ standard, or other appropriate short range wireless communication standards. Thus, device attachment 1200 may be used with user device 1250 without relying on the device connector, if a connection through the device connector is not available or not desired.

In some embodiments, wireless communication module 1209 may be configured to manage wireless communication between processing module 1204 and other external devices, such as a desktop computer, thus allowing device attachment 1250 to be used as an infrared imaging accessory for an external device as well.

Device attachment 1250 may further include, in some embodiments, cooling fins 1247 configured to provide a more efficient cooling of internal components. Cooling fins 1247 may be positioned on an exterior side surface (e.g., the top side surface) of housing 1230 near internal components, and comprise a plurality of fins or blades to increase the surface area in contact with air.

In various embodiments, device attachment 1250 may also include various other components that may be implemented in host device 102 of FIG. 1, but may be missing in a particular type of user device that device attachment 1250 may be used with. For example, motion sensors may be implemented in device attachment 1250 in the same or similar manner as motion sensors 194 of host device 102, if motion sensors are not implemented in user device 1250. Motion sensors may be utilized by processing module 1204, a processor of user device 1250, or both, in performing an NUC operation as described herein.

FIGS. 20-22 show various views of a device attachment 2000 according to another embodiment of the disclosure. Device attachment 2000 may include a housing 2030 with a tub 2032 (e.g., also referred to as a basin or recess) shaped to at least partially receive a user device 2050, a lens assembly 2005, a camera cutout 2040, a power socket 2041, replicated buttons 2042A-2042C, a switch cutout 2044, cooling fins 2047 (e.g., heat sink and cooling fins), and replicated earphone/microphone jack 2048, any one of which may be implemented in the same or similar manner as the corresponding components of device attachment 1200 of FIGS. 12-19, except for some dissimilarities in locations and shapes of some components as can be seen from FIGS. 20-22. Device attachment 2000 may include various internal components, such as an infrared sensor assembly, a processing module, and a wireless communication module, disposed within housing 2030. Any one of such internal components may be implemented in the same or similar manner as the corresponding components of device attachment 1200.

In this example, a fixed device connector plug 2052 may implement the device connector of device attachment 2000, and may provide some additional support when user device 2050 is releasably yet securely inserted into tub 2032. This example also shows a protective cover 2054, which may protectively enclose at least some of the internal components of device attachment 2000. Protective cover 2054 may comprise a translucent logo and a light source (e.g., LED light) for illuminating the translucent logo. In this regard, cooling fins 2047 may be further configured to form part of or coupled to a heat sink to provide a more efficient cooling of the light source in addition to cooling the internal components (e.g., electronics and light source to illuminate the logo and/or electronics associated with the infrared sensor assembly or infrared sensor of device attachment 2000).

Therefore, various embodiments of device attachment 1200/2000 may releasably attach to various conventional electronic devices, and beneficially provide infrared imaging capabilities to such conventional electronic devices. With device attachment 1200/2000 attached, mobile phones and other conventional electronic devices already in widespread use may be utilized for various advantageous applications of infrared imaging.

In some embodiments, infrared image data such as thermal images captured using device attachment 1200/2000 may be combined with non-thermal image data (e.g., visible light images such as red images, blue images, green images, near-infrared images, etc.). In one embodiment, the non-thermal image data may be captured by a visible-light camera that may be present on a mobile phone or other conventional electronic device that is releasably attached to device attachment 1200/2000. In another embodiment, the non-thermal image data may be captured by a visible-light camera that may be present on device attachment 1200/2000.

Figure 23:
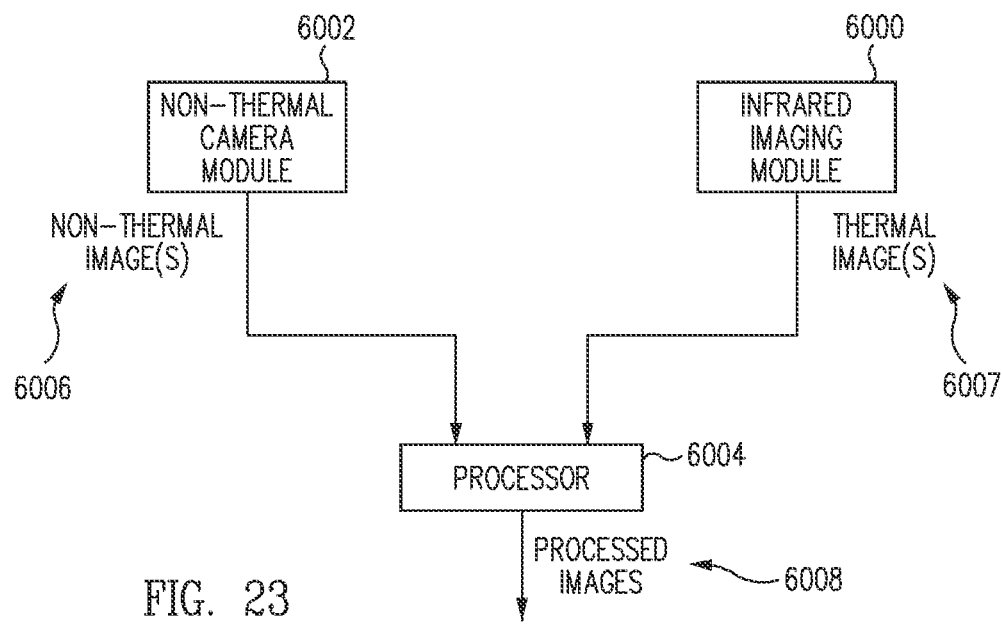
FIG. 23 illustrates a flow diagram showing how thermal images and non-thermal images can be combined to form processed images in accordance with an embodiment of the disclosure.

FIG. 23 shows an example of a process in which thermal and non-thermal images are combined. As shown in FIG. 23, an infrared imager such as infrared imaging module 6000 may be used to capture one or more thermal images 6007. Infrared imaging module 6000 may, for example, be an implementation of infrared imaging module 100 of device attachment 1200/2000.

A non-thermal camera module such as non-thermal camera module 6002 may be used to capture non-thermal images 6006. Non-thermal camera module 6002 may be implemented as a small form factor non-thermal imaging module or imaging device having one or more sensors responsive to non-thermal radiation (e.g., radiation in the visible, near infrared, short-wave infrared or other non-thermal portion of the electromagnetic spectrum). For example, in some embodiments, camera module 6002 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), or other sensors. As described in further detail below, non-thermal camera module 6002 may be a component of a user device such as device 1250 or may be a component of device attachment 1200/2000.

As shown in FIG. 23, one or more thermal images 6007 and one or more non-thermal images 6006 may be provided to a processor such as processor 6004. In various embodiments, processor 6004 may be a processor associated with device attachment 1200/2000 (e.g., processing module 1204), a processor associated with device 1250, or processor 6004 may represent the combined processing capabilities of device 1250 and device attachment 1200/2000.

Processor 6004 may fuse, superimpose, or otherwise combine non-thermal images 6006 with thermal images 6007 as further described herein to form processed images 6008. Processed images 6008 may be provided to a display of device 1250, stored in memory of device 1250 or device attachment 1200, or transmitted to external equipment (as examples).

Figure 24:
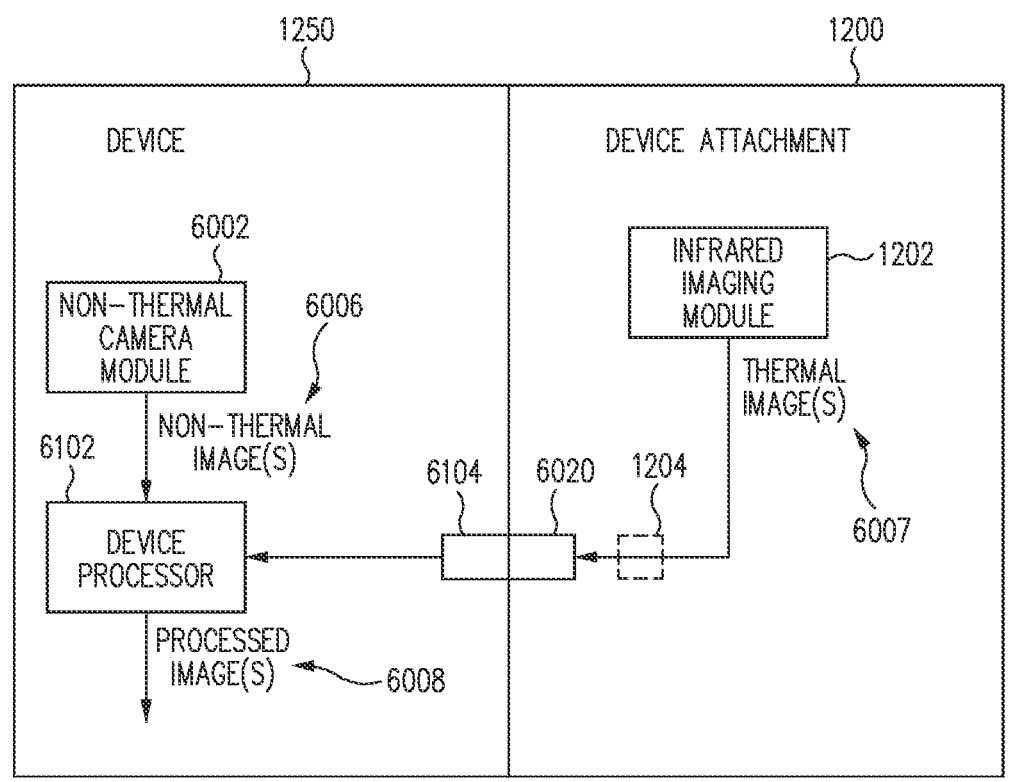
FIG. 24 illustrates a block diagram of a device and a device attachment showing how non-thermal images from a non-thermal camera module in the device may be combined with thermal images from the device attachment using a processor of the device in accordance with an embodiment of the disclosure.
Figure 25:
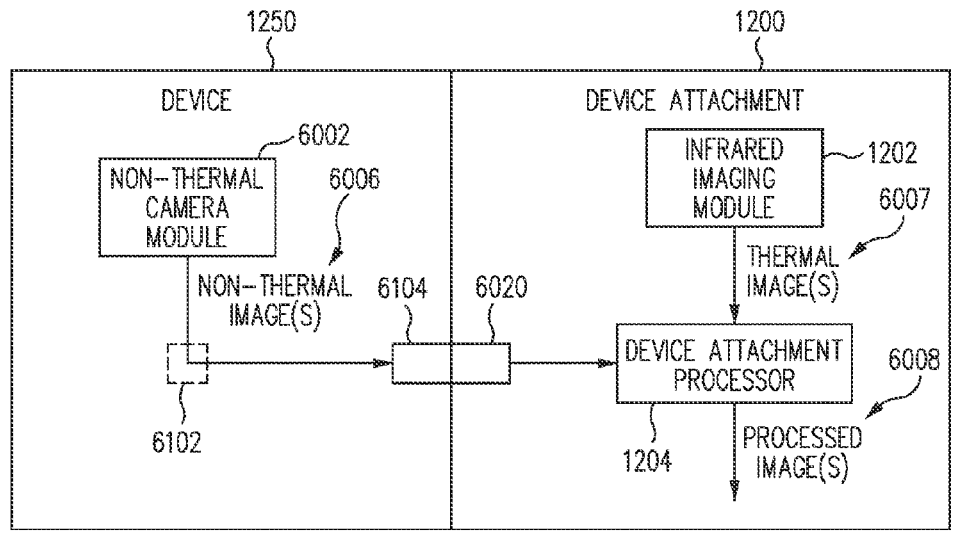
FIG. 25 illustrates a block diagram of a device and a device attachment showing how non-thermal images from a non-thermal camera module in the device may be combined with thermal images from the device attachment using a processor of the device attachment in accordance with an embodiment of the disclosure.
Figure 26:
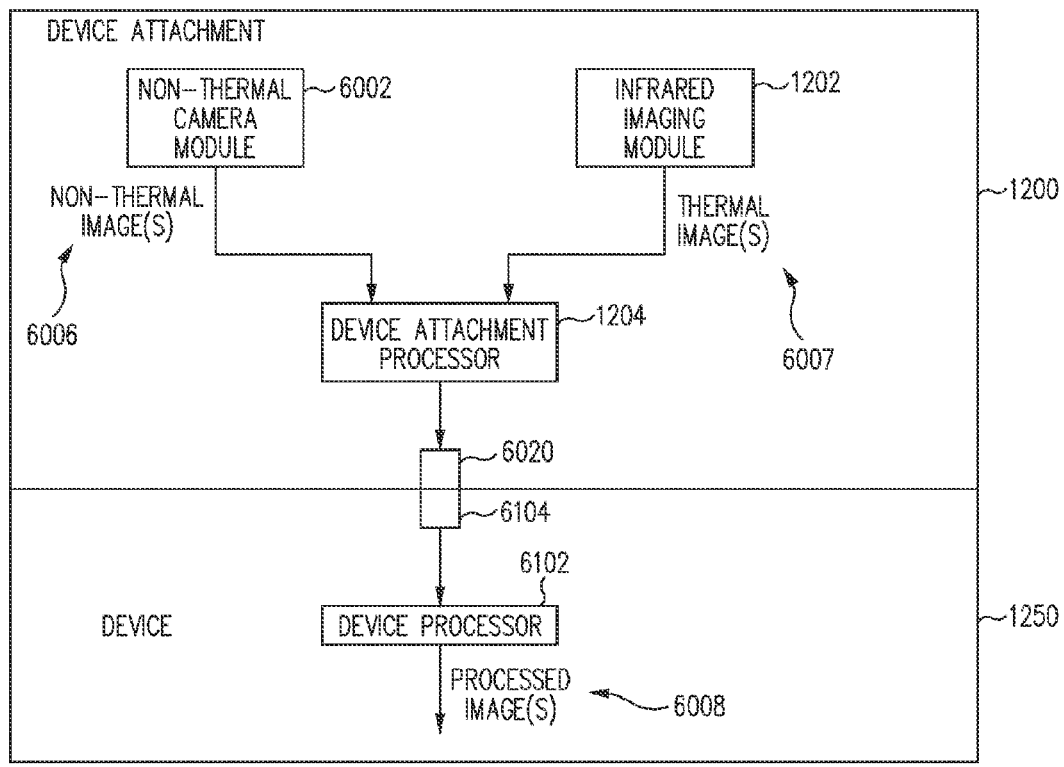
FIG. 26 illustrates a block diagram of a device and a device attachment showing how non-thermal images from a non-thermal camera module in the device attachment may be combined with thermal images from the device attachment in accordance with an embodiment of the disclosure.

FIGS. 24, 25, and 26 show various exemplary embodiments for device 1250 and a releasably attached device component such as device attachment 1200 (identified only for purposes of example; any of device attachments 1200, 1201, 1203, 2000, or others may be used interchangeably in any of the embodiments described herein where appropriate) that may be used when it is desired to capture and combine non-thermal and thermal images.

In the embodiment shown in FIG. 24, non-thermal camera module 6002 is implemented as a component of device 1250. In this embodiment, non-thermal images 6006 are captured using non-thermal camera module 6002 of device 1250 and provided to device processor 6102. Thermal images 6007 are captured using infrared imaging module 1202 of device attachment 1200 and are also provided to device processor 6102 wirelessly or through device connector 6020 (e.g., a device connector of the type described above in connection with FIGS. 12-19) and a mating connector 6104 on device 1250. Mating connector 6104 may be a proprietary connector, a standardized connector such as a Universal Serial Bus (USB) connector or a Portable Digital Media Interface (PDMI), or other standard connectors as provided in user devices. If desired, thermal images 6007 may undergo some processing using processing module 1204 before being provided to device processor 6102.

In the embodiment shown in FIG. 25, non-thermal images 6006 are captured using non-thermal camera module 6002 of device 1250 and provided to device attachment processor 1204 wirelessly or through connectors 6104 and 6020. In this embodiment, thermal images 6007 are also provided to processor 1204 from infrared imaging module 1202 to be combined with non-thermal images 6006 to form processed images 6008. If desired, non-thermal images 6006 may undergo some processing using processor 6102 before being provided to device attachment processor 1204. In this embodiment, processed images 6008 may be provided back to processor 6102 to be stored, displayed, or otherwise handled by processor 6102.

In the embodiment shown in FIG. 26, non-thermal camera module 6002 is implemented as a component of device attachment 1200. In this embodiment, both non-thermal images 6006 and thermal images 6007 are captured using imaging sensors in device attachment 1200. In this embodiment, non-thermal images 6006 are captured using non-thermal imaging module 6002 of device attachment 1200, thermal images 6007 are captured using infrared imaging module 1202, and both thermal images 6007 and non-thermal images 6006 are provided to device attachment processor 1204 to be combined to form processed images 6008. Non-thermal images 6006 and thermal images 6007 may be partially or completely combined as desired by device attachment processor 1204 before being provided to device processor 6102, unprocessed non-thermal images 6006 and thermal images 6007 may be provided to device processor 6102 for processing and combining, or image processing operations for non-thermal images 6006 and thermal images 6007 may be shared by processors 1204 and 6102.

Figure 27:
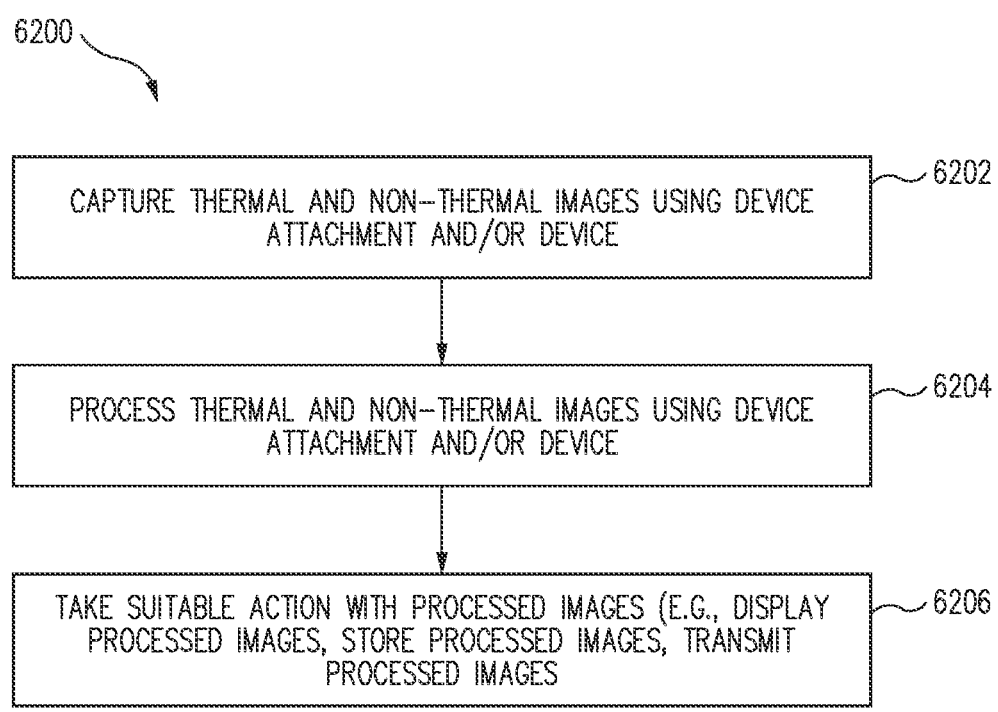
FIG. 27 illustrates a process for capturing and combining thermal and non-thermal images using a device and a device attachment in accordance with an embodiment of the disclosure.

FIG. 27 illustrates a process 6200 for capturing and combining thermal and non-thermal images using a device and a device attachment.

At block 6202, thermal and non-thermal images may be captured. Thermal images may be captured using an infrared imaging sensor in a device attachment attached to a device. Non-thermal images may be captured using a non-thermal camera module in the device (see, e.g., FIGS. 24 and 25) or in the device attachment (see, e.g., FIG. 26).

At block 6204, the thermal and non-thermal images captured at block 6202 may be processed. The thermal and non-thermal images may undergo individual processing operations and/or processing operations for combining, fusing, or superimposing the images. Processing the thermal and non-thermal images may include parallax corrections based on the distance between the non-thermal camera module and the infrared imaging sensor used to capture the images. The thermal and non-thermal images may be processed using a processor in the device (see, e.g., FIGS. 24, and 26) and/or using a processor in the device attachment (see, e.g., FIG. 25) to form processed (e.g., combined, fused, or superimpose) images as further described herein, for example, with reference to FIGS. 35 and 36. Processing the thermal images may also include performing various image correction operations such as a NUC process as described herein.

At block 6206, suitable action may be taken with the processed images. Suitable action may include displaying the processed images (e.g., using a display of the device), storing the processed images (e.g., on the device and/or on the device attachment), and/or transmitting the processed images (e.g., between the device and the device attachment, or to external equipment).

FIGS. 28-29 and 30-31 are perspective views of other device attachments 1201 and 1203, respectively, configured to receive various types of user devices. In the embodiments shown in FIGS. 28-29 and 30-31, device attachments 1201 and 1203 may also include both thermal and non-thermal imaging components, and may be implemented in accordance with any of the various features of device attachments 1200 and 2000 described herein.

Figure 28:
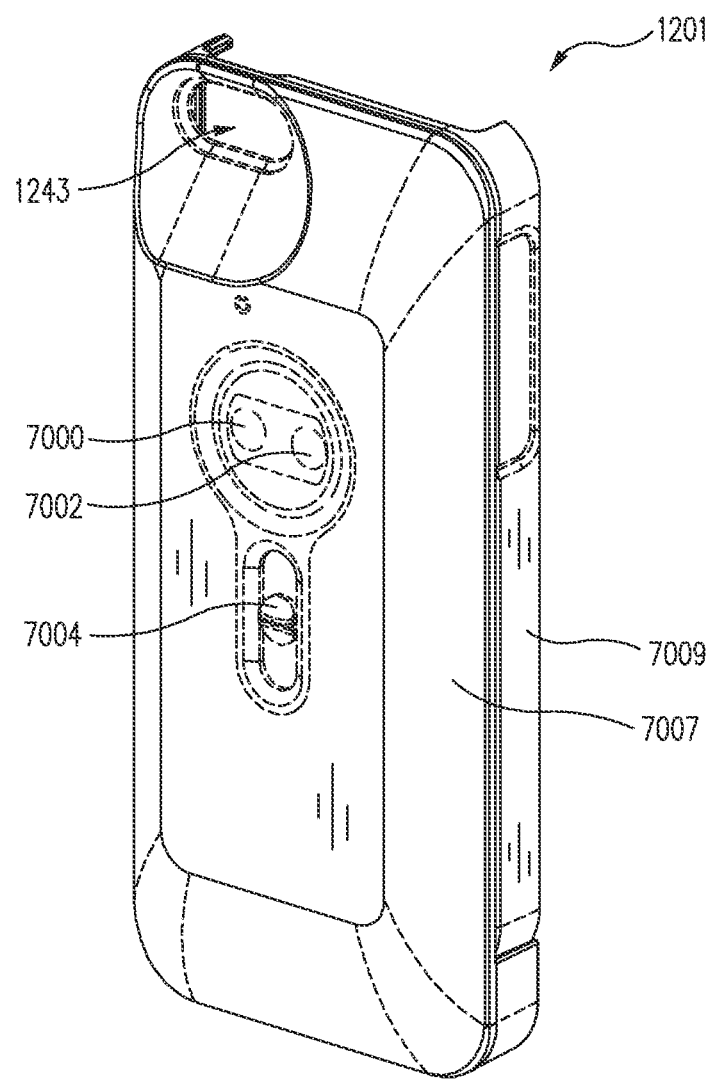
FIG. 28 illustrates a front perspective view of a device attachment in accordance with an embodiment of the disclosure.

In the embodiment of FIG. 28, a rear perspective view of a device attachment having a shape for receiving devices from Apple, Inc.® (e.g., iPhone™ devices, iPad™ devices, or iPod Touch™ devices) is shown. As shown in FIG. 28, device attachment 1200 may include a camera window 1243 through which the device camera (e.g., a non-thermal camera module such as a visible light camera module of the device) can capture images, and a plurality of imaging components such as infrared sensor 7000 and non-thermal camera module 7002. If desired, device attachment 1201 may also include a mechanical shutter such as user operable shutter 7004. User operable shutter 7004 may be moved by a user of device attachment 1200 to selectively block or unblock imaging components 7000 and/or 7002. In some embodiments, user operable shutter 7004 may also power off or on device attachment 1200 when moved to block or unblock imaging components 7000 and 7002. In some embodiments, user operable shutter 7004 may be used, for example, to protect imaging components 7000 and 7002 when not in use. Shutter 7004 may also be used as a temperature reference as part of a calibration process (e.g., a NUC process, radiometric calibration process, or other calibration processes) for infrared sensor 7000 as would be understood by one skilled in the art.

Infrared sensor 7000 may include an infrared imaging module such as infrared imaging module 100 and other suitable components of an infrared sensor (e.g., lenses, filters, and/or windows) as described herein. Infrared sensor 7000 and non-thermal camera module 7002 may be used to generate respective infrared (e.g., thermal) and non-thermal images to be used separately or in combination as described in connection with FIGS. 23, 26, and 27 and/or other image combination processes described hereinafter. For example, infrared sensor 7000 may be an implementation of infrared imaging module 1202 and non-thermal camera module 7002 may be an implementation of non-thermal camera module 6002 (see, e.g., FIG. 26).

As shown in FIG. 28, device attachment 1250 may include a front portion 7007 and a rear portion 7009. Front portion 7007 may be formed from a housing that encloses functional components of the device attachment such as a battery, connectors, imaging components, processors, memory, communications components, and/or other components of a device attachment as described herein. Rear portion 7009 may be a structural housing portion having a shape that forms a recess into which a user device can be releasably attached.

Figure 29:
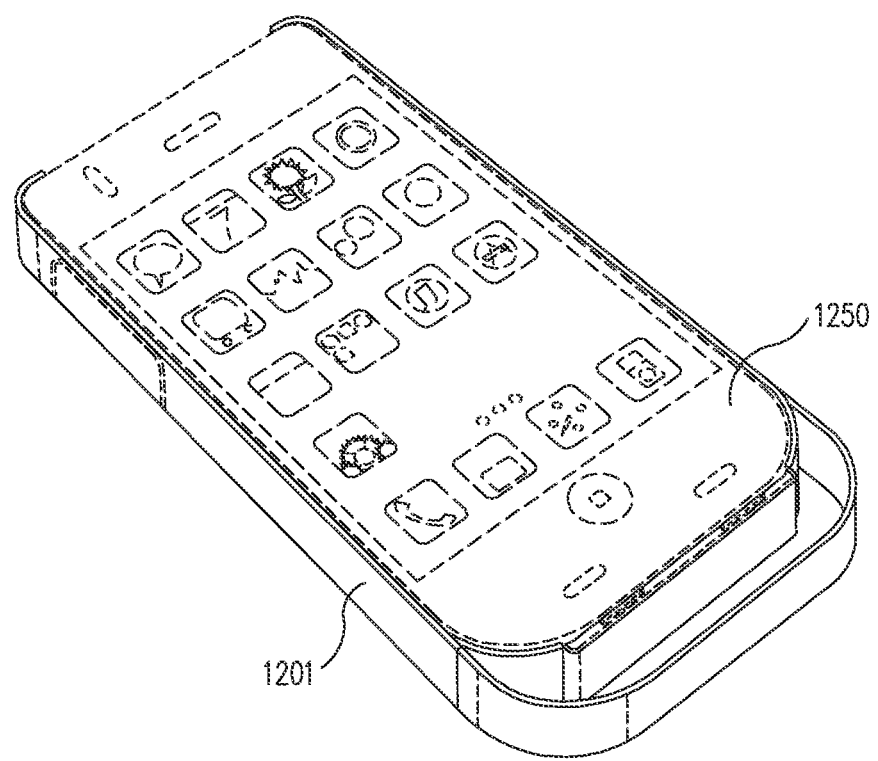
FIG. 29 illustrates a rear perspective view of a device attachment in accordance with an embodiment of the disclosure.

FIG. 29 is a front perspective view of the device attachment of FIG. 28 showing how a user device 1250 from Apple, Inc.® may be releasably attached to device attachment 1201 (e.g., by inserting the device into a recess in a housing portion for the device attachment formed from a rear wall and at least one sidewall that at least partially surround the device).

Figure 30:
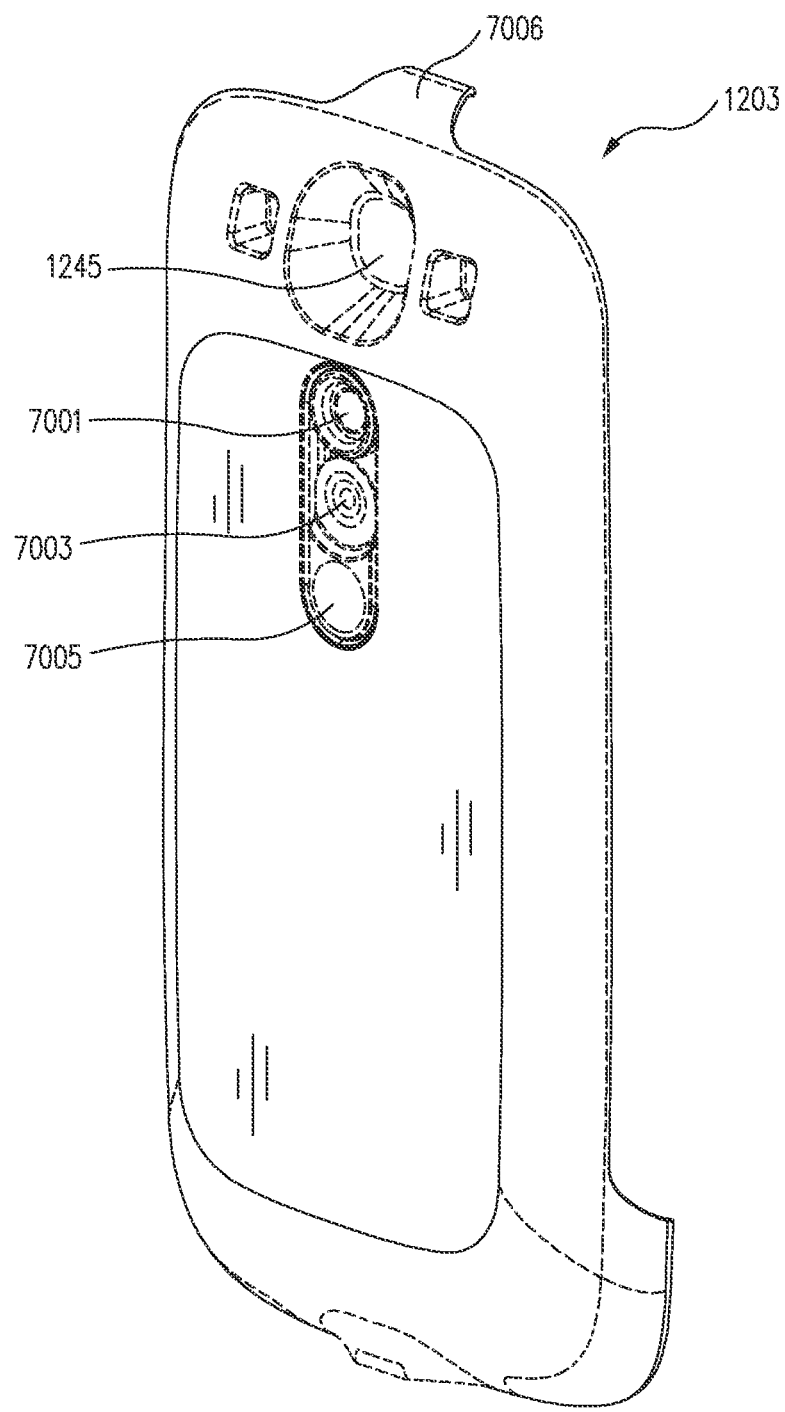
FIG. 30 illustrates a front perspective view of a device attachment in accordance with an embodiment of the disclosure.

In the embodiment of FIG. 30, a rear perspective view of a device attachment 1203 having a shape for receiving devices from Samsung Electronics, Ltd.® (e.g., Galaxy Tab™ devices, Galaxy S™ devices, Galaxy Note™ devices, other Galaxy™ devices, or other devices from Samsung). As shown in FIG. 30, device attachment 1203 may include a camera window 1245 through which the device camera (e.g., a non-thermal camera module such as a visible light camera module in the device) can capture images, and a plurality of imaging components such as infrared sensor 7001 and non-thermal camera module 7003. If desired, device attachment 1200 may also include a mechanical shutter such as user operable shutter 7005. User operable shutter 7005 may be moved by a user of device attachment 1203 to selectively block or unblock imaging components 7001 and 7003. In some embodiments, user operable shutter

7005 may power off or on device attachment 1203 when moved to block or unblock imaging components 7001 and 7003. In this type of arrangement, device attachment 1203 may also include an attachment member such as engagement member 7006 configured to extend around a portion of a user device to securely and releasably attach the device attachment 1203 to the user device. In one embodiment, non-thermal camera module 7003 may be omitted and shutter 7005 may include an extended portion in the location at which non-thermal camera module 7003 is shown that slides over infrared sensor 7001 when a user moves shutter 7005.

Figure 31:
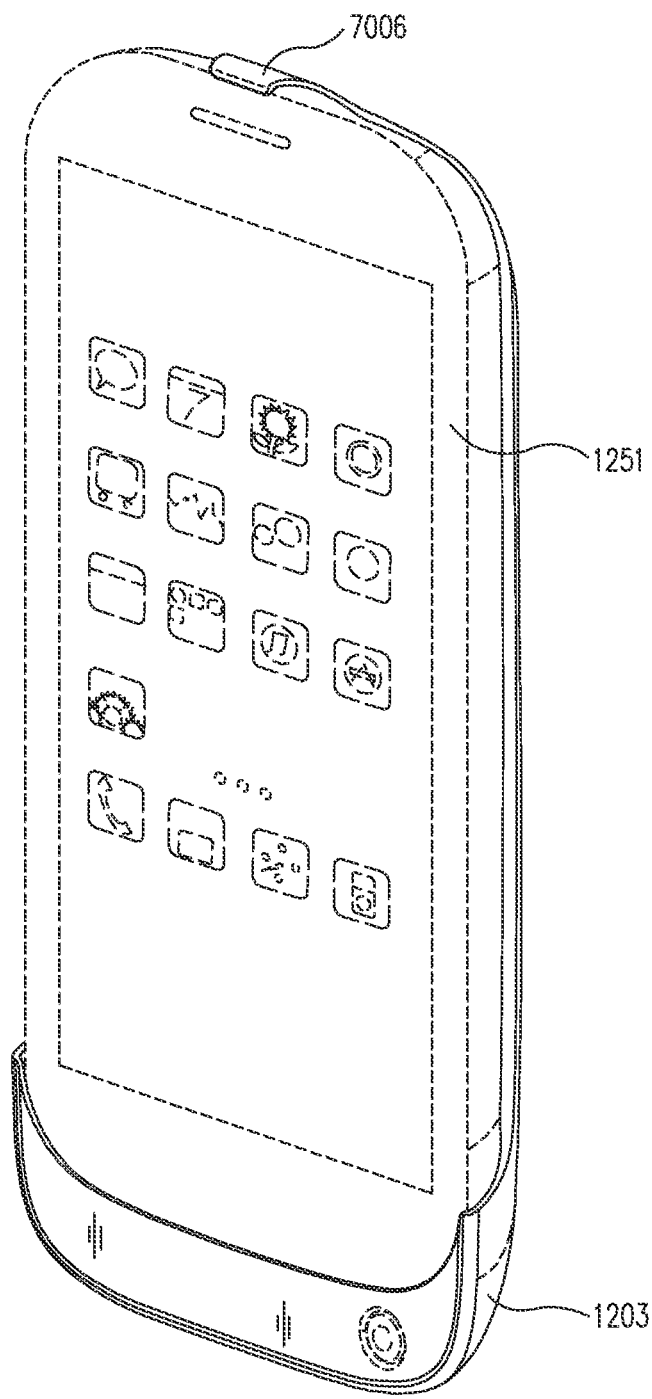
FIG. 31 illustrates a rear perspective view of a device attachment in accordance with an embodiment of the disclosure.

FIG. 31 is a front perspective view of the device attachment 1203 of FIG. 30 showing how a user device 1251 from Samsung Electronics, Ltd.® may be releasably attached to device attachment 1203 (e.g., by inserting the user device 1251 into a recess in a housing for the device attachment 1203 formed from a rear wall, at least one sidewall, and an attachment member 7006 that at least partially surround the device).

As shown in FIGS. 29 and 31 (as examples), device attachments 1201/1203 may be arranged so that a display of the user device 1250/1251 remains visible and accessible to the user when device attachment 1201/1203 is attached to the device.

The examples of FIGS. 28, 29, 30, and 31 are merely illustrative. If desired, attachment device 1200 may be configured to have a size and shape suitable for receiving a user device from any manufacturer.

Various embodiments in which non-thermal images are combined with thermal images as described above in connection with, for example, FIGS. 23-27 are discussed herein in further detail in, for example, FIGS. 34-39. The examples discussed in connection with FIGS. 34-39 describe combining or fusing thermal images with visible light images, however, it should be appreciated that the devices, processes and techniques described may be applied for combining or fusing any suitable thermal and non-thermal images.

Figure 32:
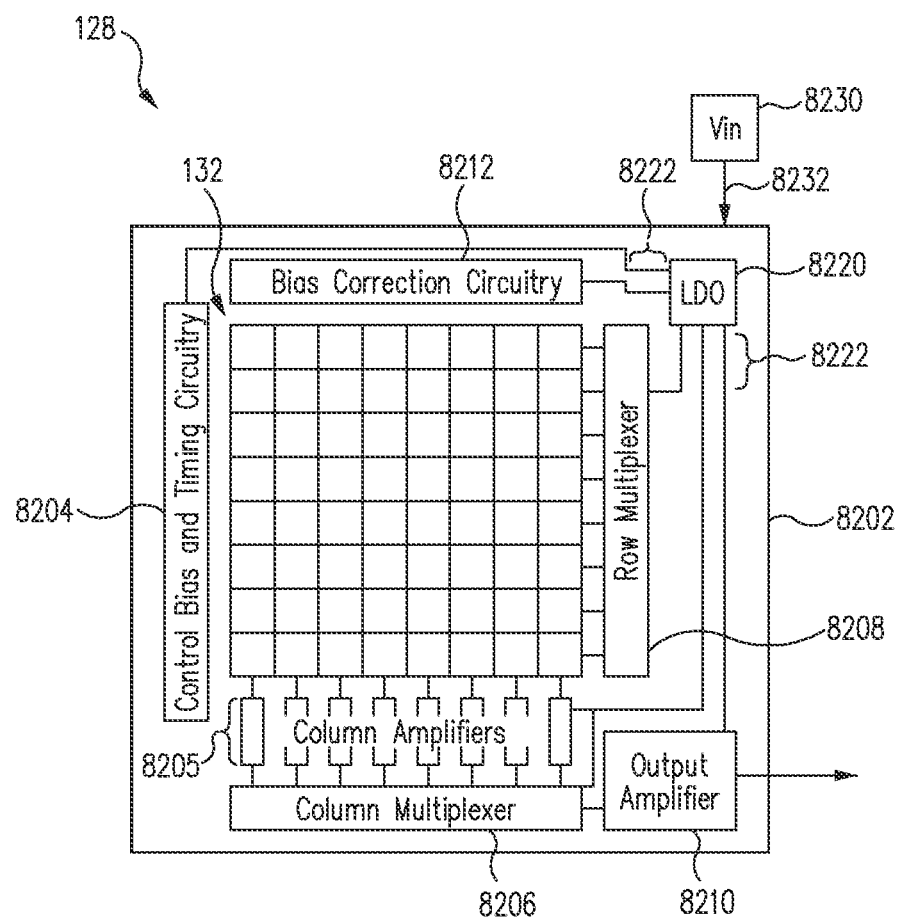
FIG. 32 illustrates a block diagram of another implementation of an infrared sensor assembly including an array of infrared sensors and a low-dropout regulator in accordance with an embodiment of the disclosure.
Figure 33:
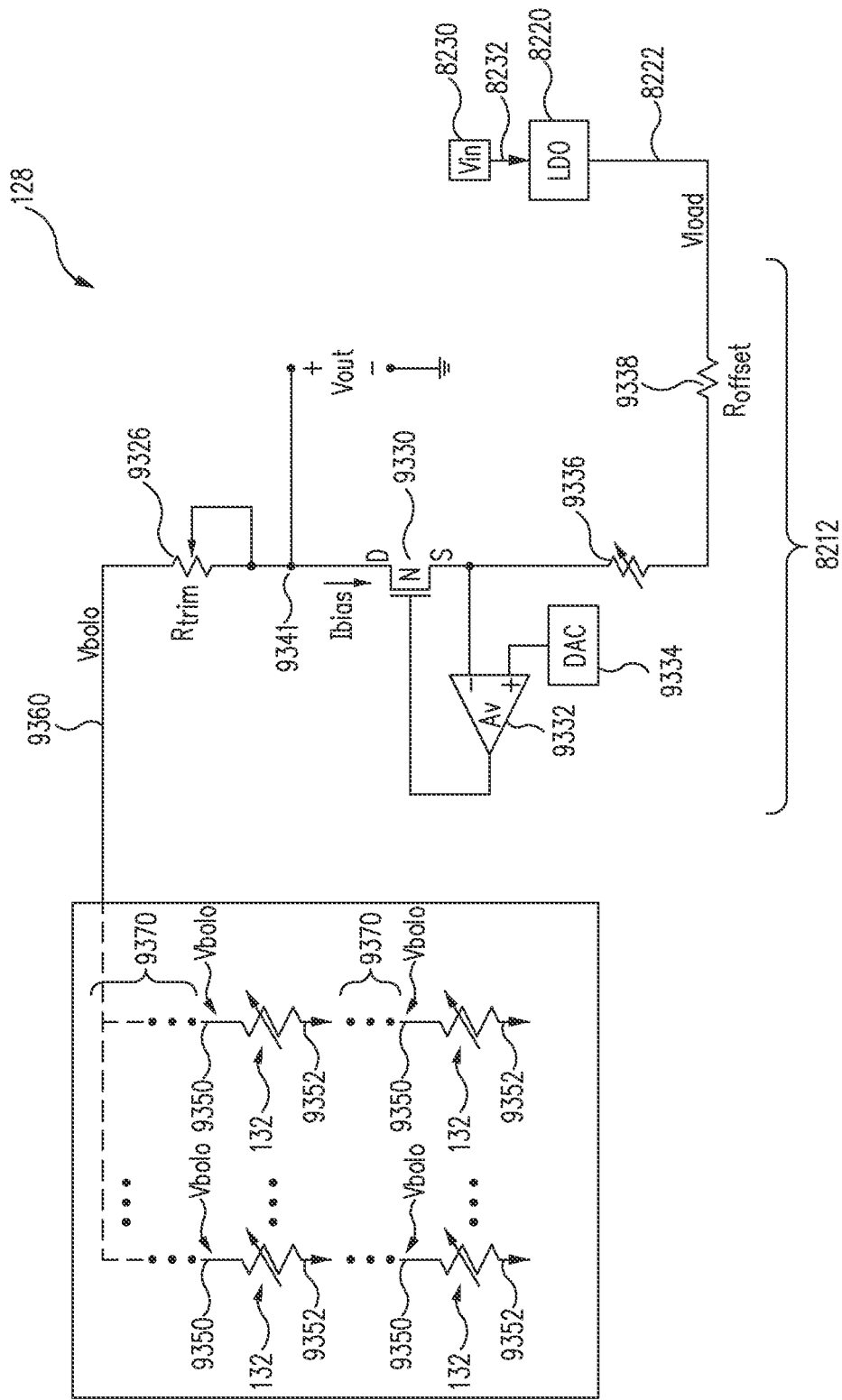
FIG. 33 illustrates a circuit diagram of a portion of the infrared sensor assembly of FIG. 32 in accordance with an embodiment of the disclosure.

Before discussing various embodiments in which non-thermal camera modules are used to generate non-thermal images for combination or fusion with thermal images, FIGS. 32 and 33 describe a low power implementation for an infrared imaging module.

As discussed, in various embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

For example, FIG. 32 illustrates a block diagram, of another implementation of infrared sensor assembly 128 including infrared sensors 132 and an LDO 8220 in accordance with an embodiment of the disclosure. As shown, FIG. 32 also illustrates various components 8202, 8204, 8205, 8206, 8208, and 8210 which may implemented in the same or similar manner as corresponding components previously described with regard to FIG. 4. FIG. 32 also illustrates bias correction circuitry 8212 which may be used to adjust one or more bias voltages provided to infrared sensors 132 (e.g., to compensate for temperature changes, self-heating, and/or other factors).

In some embodiments, LDO 8220 may be provided as part of infrared sensor assembly 128 (e.g., on the same chip and/or wafer level package as the ROIC). For example, LDO 8220 may be provided as part of an FPA with infrared sensor assembly 128. As discussed, such implementations may reduce power supply noise introduced to infrared sensor assembly 128 and thus provide an improved PSRR. In addition, by implementing the LDO with the ROIC, less die area may be consumed and fewer discrete die (or chips) are needed.

LDO 8220 receives an input voltage provided by a power source 8230 over a supply line 8232. LDO 8220 provides an output voltage to various components of infrared sensor assembly 128 over supply lines 8222. In this regard, LDO 8220 may provide substantially identical regulated output voltages to various components of infrared sensor assembly 128 in response to a single input voltage received from power source 8230.

For example, in some embodiments, power source 8230 may provide an input voltage in a range of approximately 2.8 volts to approximately 11 volts (e.g., approximately 2.8 volts in one embodiment), and LDO 8220 may provide an output voltage in a range of approximately 1.5 volts to approximately 2.8 volts (e.g., approximately 2.5 volts in one embodiment). In this regard, LDO 8220 may be used to provide a consistent regulated output voltage, regardless of whether power source 8230 is implemented with a conventional voltage range of approximately 9 volts to approximately 11 volts, or a low voltage such as approximately 2.8 volts. As such, although various voltage ranges are provided for the input and output voltages, it is contemplated that the output voltage of LDO 8220 will remain fixed despite changes in the input voltage.

By regulating a single power source 8230 by LDO 8220, appropriate voltages may be separately provided (e.g., to reduce possible noise) to all components of infrared sensor assembly 128 with reduced complexity. The use of LDO 8220 also allows infrared sensor assembly 128 to operate in a consistent manner, even if the input voltage from power source 8230 changes (e.g., if the input voltage increases or decreases as a result of charging or discharging a battery or other type of device used for power source 8230).

LDO 8220 may be implemented to provide a low voltage (e.g., approximately 2.5 volts). This contrasts with the multiple higher voltages typically used to power conventional FPAs, such as: approximately 3.3 volts to approximately 5 volts used to power digital circuitry; approximately 3.3 volts used to power analog circuitry; and approximately 9 volts to approximately 11 volts used to power loads. Also, in some embodiments, the use of LDO 8220 may reduce or eliminate the need for a separate negative reference voltage to be provided to infrared sensor assembly 128.

Additional aspects of the low voltage operation of infrared sensor assembly 128 may be further understood with reference to FIG. 33. FIG. 33 illustrates a circuit diagram of a portion of infrared sensor assembly 128 of FIG. 32 in accordance with an embodiment of the disclosure. In particular, FIG. 33 illustrates additional components of bias correction circuitry 8212 (e.g., components 9326, 9330, 9332, 9334, 9336, 9338, and 9341) connected to LDO 8220 and infrared sensors 132. For example, bias correction circuitry 8212 may be used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 128 may also be implemented in accordance with the various components identified in U.S. Pat. No. 6,812,465 issued Nov. 2, 2004 which is hereby incorporated by reference in its entirety.

In various embodiments, some or all of the bias correction circuitry 8212 may be implemented on a global array basis as shown in FIG. 33 (e.g., used for all infrared sensors 132 collectively in an array). In other embodiments, some or all of the bias correction circuitry 8212 may be implemented an individual sensor basis (e.g., entirely or partially duplicated for each infrared sensor 132). In some embodiments, bias correction circuitry 8212 and other components of FIG. 33 may be implemented as part of ROTC 8202.

As shown in FIG. 33, LDO 8220 provides a load voltage Vload to bias correction circuitry 8212 along one of supply lines 8222. As discussed, in some embodiments, Vload may be approximately 2.5 volts which contrasts with larger voltages of approximately 9 volts to approximately 11 volts that may be used as load voltages in conventional infrared imaging devices.

Based on Vload, bias correction circuitry 8212 provides a sensor bias voltage Vbolo at a node 9360. Vbolo may be distributed to one or more infrared sensors 132 through appropriate switching circuitry 9370 (e.g., represented by broken lines in FIG. 33). In some examples, switching circuitry 9370 may be implemented in accordance with appropriate components identified in U.S. Pat. Nos. 6,812,465 and 7,679,048 previously referenced herein.

Each infrared sensor 132 includes a node 9350 which receives Vbolo through switching circuitry 9370, and another node 9352 which may be connected to ground, a substrate, and/or a negative reference voltage. In some embodiments, the voltage at node 9360 may be substantially the same as Vbolo provided at nodes 9350. In other embodiments, the voltage at node 9360 may be adjusted to compensate for possible voltage drops associated with switching circuitry 9370 and/or other factors.

Vbolo may be implemented with lower voltages than are typically used for conventional infrared sensor biasing. In one embodiment, Vbolo may be in a range of approximately 0.2 volts to approximately 0.7 volts. In another embodiment, Vbolo may be in a range of approximately 0.4 volts to approximately 0.6 volts. In another embodiment, Vbolo may be approximately 0.5 volts. In contrast, conventional infrared sensors typically use bias voltages of approximately 1 volt.

The use of a lower bias voltage for infrared sensors 132 in accordance with the present disclosure permits infrared sensor assembly 128 to exhibit significantly reduced power consumption in comparison with conventional infrared imaging devices. In particular, the power consumption of each infrared sensor 132 is reduced by the square of the bias voltage. As a result, a reduction from, for example, 1.0 volt to 0.5 volts provides a significant reduction in power, especially when applied to many infrared sensors 132 in an infrared sensor array. This reduction in power may also result in reduced self-heating of infrared sensor assembly 128.

In accordance with additional embodiments of the present disclosure, various techniques are provided for reducing the effects of noise in image frames provided by infrared imaging devices operating at low voltages.

For example, referring to FIG. 33, when LDO 8220 maintains Vload at a low voltage in the manner described herein, Vbolo will also be maintained at its corresponding low voltage and the relative size of its output signals may be reduced. As a result, noise, self heating, and/or other phenomena may have a greater effect on the smaller output signals read out from infrared sensors 132, resulting in variations (e.g., errors) in the output signals.

To compensate for such phenomena, infrared sensor assembly 128, infrared imaging module 100, and/or host device 102 may be implemented with various array sizes, frame rates, and/or frame averaging techniques. For example, as discussed, a variety of different array sizes are contemplated for infrared sensors 132. In some embodiments, infrared sensors 132 may be implemented with array sizes ranging from 32 by 32 to 160 by 120 infrared sensors 132. Other example array sizes include 80 by 64, 80 by 60, 64 by 64, and 64 by 32. Any desired array size may be used.

Advantageously, when implemented with such relatively small array sizes, infrared sensor assembly 128 may provide image frames at relatively high frame rates without requiring significant changes to ROIC and related circuitry. For example, in some embodiments, frame rates may range from approximately 120 Hz to approximately 480 Hz.

In some embodiments, the array size and the frame rate may be scaled relative to each other (e.g., in an inversely proportional manner or otherwise) such that larger arrays are implemented with lower frame rates, and smaller arrays are implemented with higher frame rates. For example, in one embodiment, an array of 160 by 120 may provide a frame rate of approximately 120 Hz. In another embodiment, an array of 80 by 60 may provide a correspondingly higher frame rate of approximately 240 Hz. Other frame rates are also contemplated.

By scaling the array size and the frame rate relative to each other, the particular readout timing of rows and/or columns of the FPA may remain consistent, regardless of the actual FPA size or frame rate. In one embodiment, the readout timing may be approximately 63 microseconds per row or column.

As previously discussed with regard to FIG. 8, the image frames captured by infrared sensors 132 may be provided to a frame averager 804 that integrates multiple image frames to provide image frames 802 (e.g., processed image frames) with a lower frame rate (e.g., approximately 30 Hz, approximately 60 Hz, or other frame rates) and with an improved signal to noise ratio. In particular, by averaging the high frame rate image frames provided by a relatively small FPA, image noise attributable to low voltage operation may be effectively averaged out and/or substantially reduced in image frames 802. Accordingly, infrared sensor assembly 128 may be operated at relatively low voltages provided by LDO 8220 as discussed without experiencing additional noise and related side effects in the resulting image frames 802 after processing by frame averager 804.

Although a single array of infrared sensors 132 is illustrated, it is contemplated that multiple such arrays may be used together to provide higher resolution image frames (e.g., a scene may be imaged across multiple such arrays). Such arrays may be provided in multiple infrared sensor assemblies 128 and/or provided in the same infrared sensor assembly 128. Each such array may be operated at low voltages as described, and also may be provided with associated ROIC circuitry such that each array may still be operated at a relatively high frame rate. The high frame rate image frames provided by such arrays may be averaged by shared or dedicated frame averagers 804 to reduce and/or eliminate noise associated with low voltage operation. As a result, high resolution infrared images may be obtained while still operating at low voltages.

In various embodiments, infrared sensor assembly 128 may be implemented with appropriate dimensions to permit infrared imaging module 100 to be used with a small form factor socket 104, such as a socket used for mobile devices. For example, in some embodiments, infrared sensor assembly 128 may be implemented with a chip size in a range of approximately 4.0 mm by approximately 4.0 mm to approximately 5.5 mm by approximately 5.5 mm (e.g., approximately 4.0 mm by approximately 5.5 mm in one example). Infrared sensor assembly 128 may be implemented with such sizes or other appropriate sizes to permit use with socket 104 implemented with various sizes such as: 8.5 mm by 8.5 mm, 8.5 mm by 5.9 mm, 6.0 mm by 6.0 mm, 5.5 mm by 5.5 mm, 4.5 mm by 4.5 mm, and/or other socket sizes such as, for example, those identified in Table 1 of U.S. Provisional Patent Application No. 61/495,873 previously referenced herein.

In some embodiments, such as those described above in connection with, for example, FIGS. 23-27, infrared imaging modules 100 may be configured to produce infrared images that can be combined with non-thermal images such as visible spectrum images produce high resolution, high contrast, and/or targeted contrast combined images of a scene, for example, that include highly accurate radiometric data (e.g., infrared information) corresponding to one or more objects in the scene.

Figure 34:
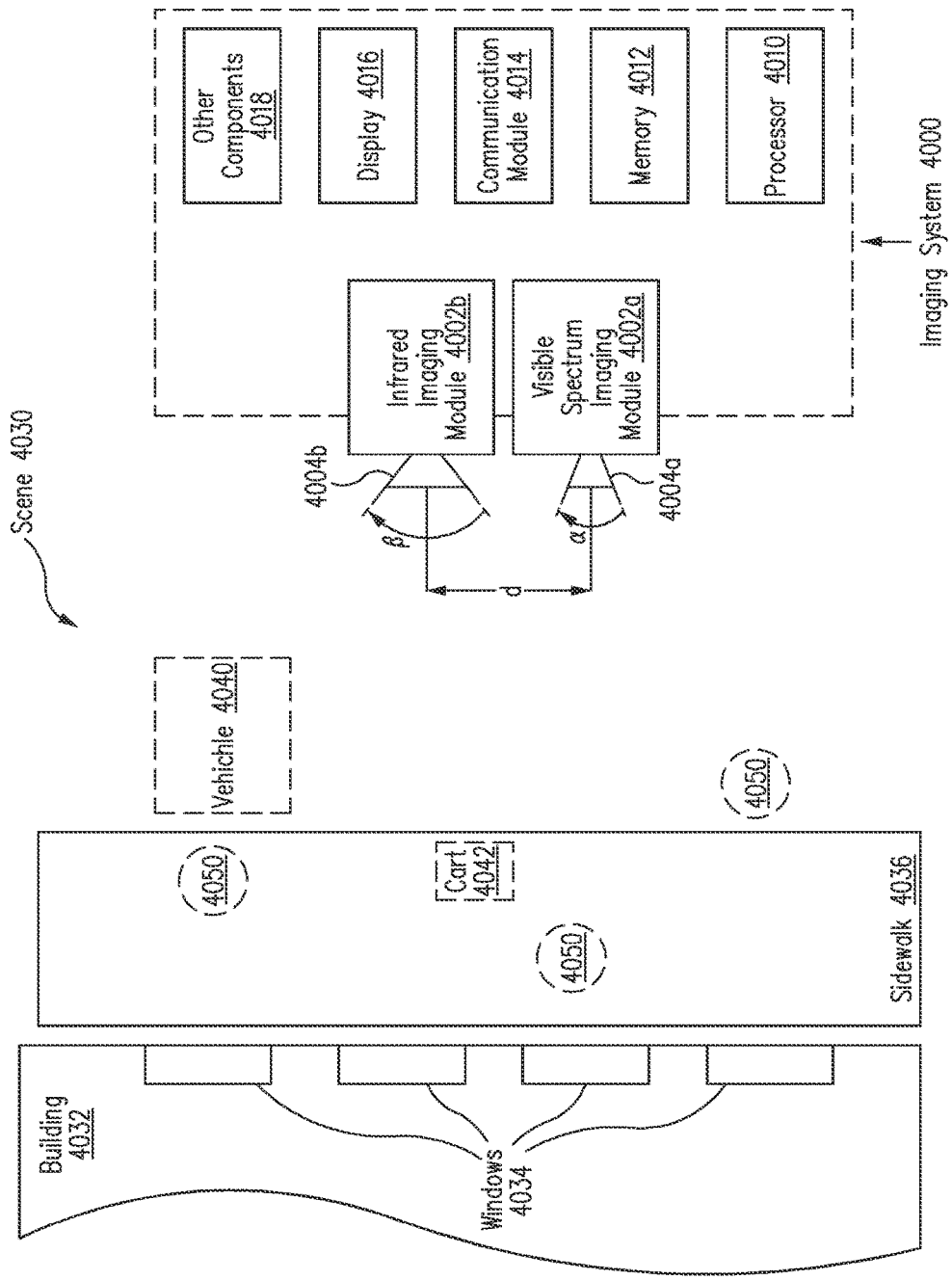
FIG. 34 illustrates a block diagram of an imaging system adapted to image a scene in accordance with an embodiment of the disclosure.

Referring now to FIG. 34, FIG. 34 shows a block diagram of imaging system 4000 adapted to image scene 4030 in accordance with an embodiment of the disclosure. For example, system 4000 may represent a combination of any of the user devices and any of the device attachments described herein. System 4000 may include one or more imaging modules, such as visible spectrum imaging module 4002a and infrared imaging module 4002b (which may respectively represent any of the non-thermal camera modules and infrared imaging modules described herein, or combinations thereof, for example), processor 4010 (which may represent any of the processors described herein, or combinations thereof, for example), memory 4012 (e.g., one or more memory devices provided in any of the user devices and/or device attachments described herein and implemented in a similar manner as memory 196 of host device 102, for example), a communication module 4014, a display 4016, and other components 4018. Where appropriate, elements of system 4000 may be implemented in the same or similar manner as other devices and systems described herein and may be configured to perform various NUC processes and other processes as described herein.

For example, system 4000 may form a portion of a device attachment 1200. For example, visible spectrum imaging module 4002a may be an implementation of a non-thermal camera module and/or infrared imaging module 4002b may be an implementation of an infrared sensor. Although system 4000 is described as including visible spectrum imaging module 4002a, it should be appreciated that visible spectrum imaging module 4002a may be substituted with any suitable non-thermal camera module. As such, descriptions of combining visible spectrum images with thermal images herein may be similarly applied to combining thermal images with non-thermal images other than visible spectrum images (e.g., near-infrared images, short-wave infrared images, etc.).

As shown in FIG. 34, scene 4030 (e.g., illustrated as a top plan view) may include various predominately stationary elements, such as building 4032, windows 4034, and sidewalk 4036, and may also include various predominately transitory elements, such as vehicle 4040, cart 4042, and pedestrians 4050. Building 4032, windows 4034, sidewalk 4036, vehicle 4040, cart 4042, and pedestrians 4050 may be imaged by visible spectrum imaging module 4002a, for example, whenever scene 4030 is visibly illuminated by ambient light (e.g., daylight) or by an artificial visible spectrum light source, for example, as long as those elements of scene 4030 are not otherwise obscured by smoke, fog, or other environmental conditions. Building 4032, windows 4034, sidewalk 4036, vehicle 4040, cart 4042, and pedestrians 4050 may be imaged by infrared imaging module 4002b to provide real-time imaging and/or low-light imaging of scene 4030 when scene 4030 is not visibly illuminated (e.g., by visible spectrum light), for example.

In some embodiments, imaging system 4000 can be configured to combine visible spectrum images from visible spectrum imaging module 4002a captured at a first time (e.g., when scene 4030 is visibly illuminated), for example, with infrared images from infrared imaging module 4002b captured at a second time (e.g., when scene 4030 is not visibly illuminated), for instance, in order to generate combined images including radiometric data and/or other infrared characteristics corresponding to scene 4030 but with significantly more object detail and/or contrast than typically provided by the infrared or visible spectrum images alone. In other embodiments, the combined images can include radiometric data corresponding to one or more objects within scene 4030, for example, and visible spectrum characteristics, such as a visible spectrum color of the objects (e.g., for predominantly stationary objects), for example. In some embodiments, both the infrared images and the combined images can be substantially real time images or video of scene 4030. In other embodiments, combined images of scene 4030 can be generated substantially later in time than when corresponding infrared and/or visible spectrum images have been captured, for example, using stored infrared and/or visible spectrum images and/or video. In still further embodiments, combined images may include visible spectrum images of scene 4030 captured before or after corresponding infrared images have been captured.

In each embodiment, visible spectrum images including elements of scene 4030 such as building 4032, windows 4034, and sidewalk 4036, can be processed to provide visible spectrum characteristics that, when combined with infrared images, allow easier recognition and/or interpretation of the combined images.

In various embodiments, one or more components of system 4000 may be combined and/or implemented or not, depending on application requirements. For example, processor 4010 may be combined with any of imaging modules 4002a-b, memory 4012, display 4016, and/or communication module 4014. In another example, processor 4010 may be combined with any of imaging modules 4002a-b with only certain operations of processor 4010 performed by circuitry (e.g., a processor, logic device, microprocessor, microcontroller, etc.) within any of the infrared imaging modules.

Thus, one or more components of system 4000 may be mounted in view of scene 4030 to provide real-time and/or enhanced infrared monitoring of scene 4030 in low light situations.

Figure 35:
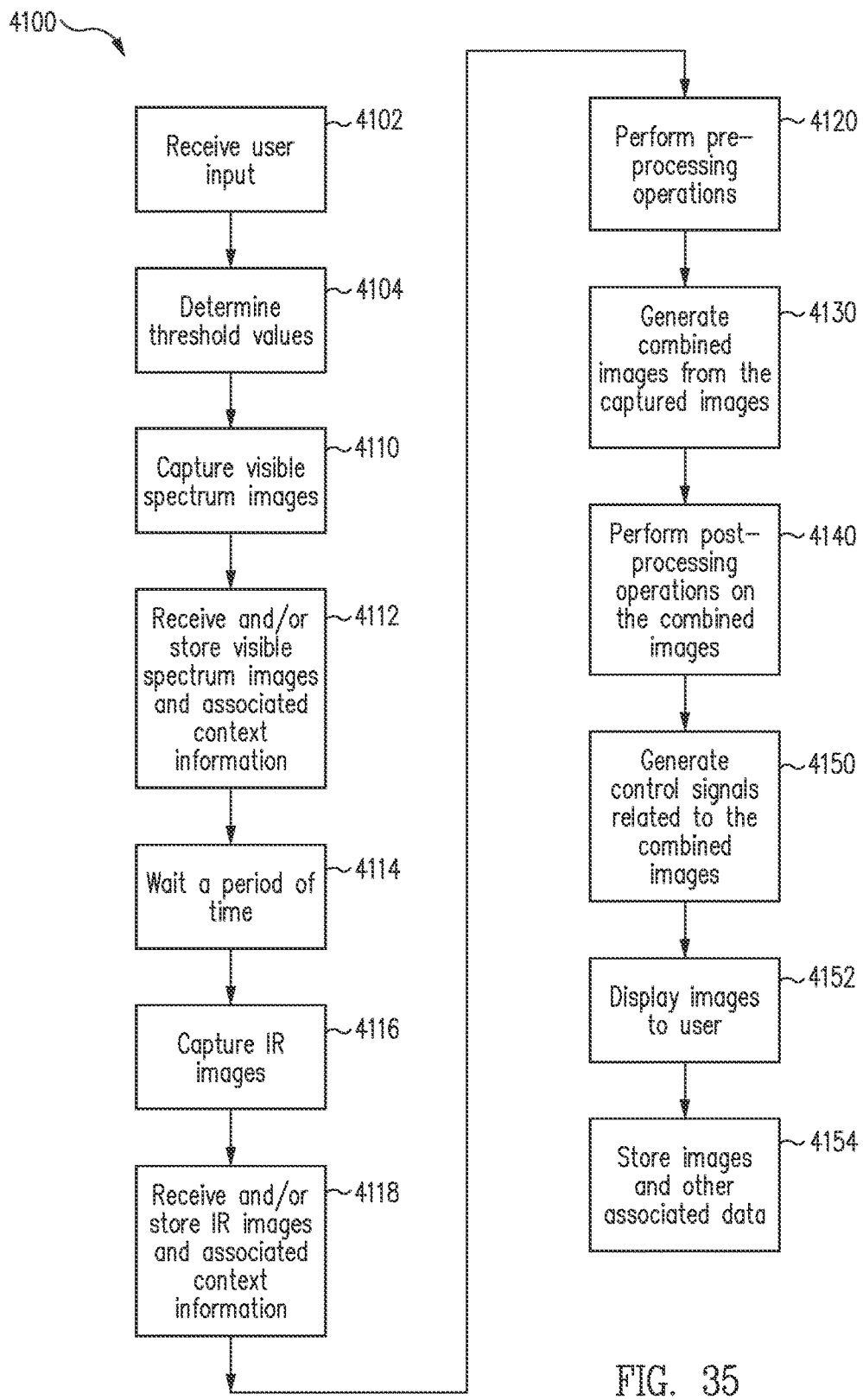
FIG. 35 illustrates a flow diagram of various operations to enhance infrared imaging of a scene in accordance with an embodiment of the disclosure.

Turning to FIG. 35, FIG. 35 illustrates a flowchart of a process 4100 to enhance infrared imaging of a scene in accordance with an embodiment of the disclosure. For example, one or more portions of process 4100 may be performed by processor 4010 and/or each of imaging modules 4002a-b of system 4000 and utilizing any of optical elements 4004a-b, memory 4012, communication module 4014, display 4016, or other components 4018, where each of imaging modules 4002a-b and/or optical elements 40104a-b may be mounted in view of at least a portion of scene 4030. In some embodiments, some elements of system 4000 may be mounted in a distributed manner (e.g., be placed in different areas inside or outside of scene 4030) and be coupled wirelessly to each other using one or more communication modules 4014. In further embodiments, imaging modules 4002*a-b* may be situated out of view of scene 4030 but may receive views of scene 4030 through optical elements 4004*a-b*.

It should be appreciated that system 4000 and scene 4030 are identified only for purposes of giving examples and that any other suitable system may include one or more components mounted in view of any other type of scene and perform all or part of process 4100. It should also be appreciated that any step, sub-step, sub-process, or block of process 4100 may be performed in an order or arrangement different from the embodiment illustrated by FIG. 35. For example, although process 4100 describes visible spectrum images being captured before infrared images are captured, in other embodiments, visible spectrum images may be captured after infrared images are captured.

In some embodiments, any portion of process 4100 may be implemented in a loop so as to continuously operate on a series of infrared and/or visible spectrum images, such as a video of scene 4030. In other embodiments, process 4100 may be implemented in a partial feedback loop including display of intermediary processing (e.g., after or while receiving infrared and/or visible spectrum images, performing preprocessing operations, generating combined images, performing post processing operations, or performing other processing of process 4100) to a user, for example, and/or including receiving user input, such as user input directed to any intermediary processing step.

At block 4102, system 4000 may receive (e.g., accept) user input. For example, display 4016 and/or other components 4018 may include a user input device, such as a touch-sensitive screen, keyboard, mouse, dial, or joystick. Processor 4010 of system 4000 may be configured to prompt for user input. For example, system 4000 may prompt a user to select a blending or a high contrast mode for generating combined images of scene 4030, and upon receiving user input, system 4000 may proceed with a selected mode.

At block 4104, system 4000 may determine one or more threshold values for use in process 4100. For example, processor 4010 and/or imaging modules 4002*a-b* may be configured to determine threshold values from user input received in block 4102. In one embodiment, processor 4010 may be configured to determine threshold values from images and/or image data captured by one or more modules of system 4000. In various embodiments, processor 4010 may be configured to use such threshold values to set, adjust, or refine one or more control parameters, blending parameters, or other operating parameters as described herein. For example, threshold values may be associated with one or more processing operations, such as blocks 4120-4140 of FIG. 35, for example.

At block 4110, system 4000 may capture one or more visible spectrum images. For example, processor 4010 and/or visible spectrum imaging module 4002*a* may be configured to capture a visible spectrum image of scene 4030 at a first time, such as while scene 4030 is visibly illuminated. In one embodiment, processor 4010, visible spectrum imaging module 4002*a*, and/or other components 4018 may be configured to detect context data, such as time of day and/or lighting or environmental conditions, and determine an appropriate first time by determining that there is sufficient ambient light and environmental clarity to capture a visible spectrum image with enough detail and/or contrast to discern objects or to generate a combined image with sufficient detail and/or contrast for a particular application of system 4000, such as intrusion monitoring or fire safety monitoring. In other embodiments, processor 4010 and/or visible spectrum imaging module 4002*a* may be configured to capture visible spectrum images according to user input and/or a schedule. Visible spectrum imaging module 4002*a* may be configured to capture visible images in a variety of color spaces/formats, including a raw or uncompressed format. In other embodiments, visible spectrum images (or other non-thermal images) may be captured using an additional device such as a user device (e.g., user device 1250) that is releasably attached to system 4000.

At block 4112, system 4000 may receive and/or store visible spectrum images and associated context information. For example, processor 4010 and/or visible spectrum imaging module 4002*a* may be configured to receive visible spectrum images of scene 4030 from a sensor portion of visible spectrum imaging module 4002*a*, to receive context data from other components 4018, and then to store the visible spectrum images with the context data in a memory portion of visible spectrum imaging module 4002*a* and/or memory 4012.

Context data may include various properties and ambient conditions associated with an image of scene 4030, such as a timestamp, an ambient temperature, an ambient barometric pressure, a detection of motion in scene 4030, an orientation of one or more of imaging modules 4002*a-b*, a configuration of one or more of optical elements 4004*a-b*, the time elapsed since imaging has begun, and/or the identification of objects within scene 4030 and their coordinates in one or more of the visible spectrum or infrared images.

Context data may guide how an image may be processed, analyzed, and/or used. For example, context data may reveal that an image has been taken while an ambient light level is high. Such information may indicate that a captured visible spectrum image may need additional exposure correction pre-processing. In this and various other ways, context data may be utilized (e.g., by processor 4010) to determine an appropriate application of an associated image. Context data may also supply input parameters for performing image analytics and processing as further described in detail below. In different embodiments, context data may be collected, processed, or otherwise managed at a processor (e.g., processor 4010) directly without being stored at a separate memory.

Visible spectrum images may be stored in a variety of color spaces/formats that may or may not be the color space/format of the received visible spectrum images. For example, processor 4010 may be configured to receive visible spectrum images from visible spectrum imaging module 4002*a* in an RGB color space, then convert and save the visible spectrum images in a YCbCr color space. In other embodiments, processor 4010 and/or visible spectrum imaging module 4002*a* may be configured to perform other image processing on received visible spectrum images prior to storing the images, such as scaling, gain correction, color space matching, and other preprocessing operations described herein with respect to block 4120.

At block 4114, system 4000 may optionally be configured to wait a period of time. For example, processor 4010 may be configured to wait until scene 4030 is not visibly illuminated (e.g., in the visible spectrum), or until scene 4030 is obscured in the visible spectrum by environmental conditions, for instance, before proceeding with process 4100. In other embodiments, processor 4010 may be configured to wait a scheduled time period or until a scheduled time before proceeding with process 4100. The time and/or time period may be adjustable depending on ambient light levels and/or environmental conditions, for example. In some embodiments, the period of time may be a substantial period of time, such as twelve hours, days, weeks, or other time period that is relatively long compared to a typical time for motion of objects (e.g., vehicles, pedestrians) within scene 4030.

At block 4116, system 4000 may capture one or more infrared images. For example, processor 4010 and/or infrared imaging module 4002b may be configured to capture an infrared image of scene 4030 at a second time, such as while scene 4030 is not visibly illuminated, or after a particular time period enforced in block 4114.

In some embodiments, the second time may be substantially different from the first time referenced in block 4110, relative to the time typically needed for a transient object to enter and leave scene 4030, for example. Processor 4010 and/or infrared imaging module 4002b may be configured to detect context data, such as time, date, and lighting conditions, and determine an appropriate second time by determining that ambient light levels are too low to capture a visible spectrum image with sufficient detail and/or contrast to discern objects in scene 4030 according to a particular application of system 4000. In some embodiments, processor 4010 and/or infrared imaging module 4002b may be configured to determine an appropriate second time by analyzing one or more visible spectrum and/or infrared images captured by imaging modules 4002a-b. In other embodiments, processor 4010 and/or infrared imaging module 4002b may be configured to capture infrared images according to user input and/or a schedule. Infrared imaging module 4002b may be configured to capture infrared images in a variety of color spaces/formats, including a raw or uncompressed format. Such images may include radiometric data encoded into a radiometric component of the infrared images.

At block 4118, system 4000 may receive and/or store infrared images and associated context information. For example, processor 4010 and/or infrared imaging module 4002b may be configured to receive infrared images of scene 4030 from a sensor portion of infrared imaging module 4002a, to receive context data from other components 4018, and then to store the infrared images with the context data in a memory portion of infrared imaging module 4002b and/or memory 4012. Context data may include various properties and ambient conditions associated with an image, for example, and may guide how an image may be processed, analyzed, and/or used.

Infrared images may be stored in a variety of color spaces/formats that may or may not be the color space/format of the received infrared images. For example, processor 4010 may be configured to receive infrared images from infrared imaging module 4002b in a raw radiometric data format, then convert and save the infrared images in a YCbCr color space. In some embodiments, radiometric data may be encoded entirely into a luminance (e.g., Y) component, a chrominance (e.g., Cr and Cb) component, or both the luminance and chrominance components of the infrared images, for example. In other embodiments, processor 4010 and/or infrared imaging module 4002b may be configured to perform other image processing on received infrared images prior to storing the images, such as scaling, gain correction, color space matching, and other preprocessing operations described herein with respect to block 4120.

At block 4120, system 4000 may perform a variety of preprocessing operations. For example, one or more of imaging modules 4002a-b and/or processor 4010 may be configured to perform one or more preprocessing operations on visible spectrum and/or infrared images of scene 4030 captured by imaging modules 4002a-b.

Preprocessing operations may include a variety of numerical, bit, and/or combinatorial operations performed on all or a portion of an image, such as on a component of an image, for example, or a selection of pixels of an image, or on a selection or series of images. In one embodiment, processing operations may include operations for correcting for differing FOVs and/or parallax resulting from imaging modules 4002a-b having different FOVs or non-co-linear optical axes. Such corrections may include image cropping, image morphing (e.g., mapping of pixel data to new positions in an image), spatial filtering, and resampling, for example. In another embodiment, a resolution of the visible spectrum and/or infrared images may be scaled to approximate or match a resolution of a corresponding image (e.g., visible spectrum to infrared, or infrared to visible spectrum), a portion of an image (e.g., for a picture-in-picture (PIP) effect), a resolution of display 4016, or a resolution specified by a user, monitoring system, or particular image processing step. Resolution scaling may include resampling (e.g., up-sampling or down-sampling) an image, for example, or may include spatial filtering and/or cropping an image.

In another embodiment, preprocessing operations may include temporal and/or spatial noise reduction operations, which may be performed on visible spectrum and/or infrared images, and which may include using a series of images, for example, provided by one or both of imaging modules 4002a-b. In a further embodiment, a NUC process may be performed on the captured and stored images to remove noise therein, for example, by using various NUC techniques disclosed herein. In another embodiment, other calibration processes for infrared images may be performed, such as profiling, training, baseline parameter construction, and other statistical analysis on one or more images provided by one or both of imaging modules 4002a-b. Calibration parameters resulting from such processes may be applied to images to correct, calibrate, or otherwise adjust radiometric data in infrared images, for example, or to correct color or intensity data of one or more visible spectrum images.

In one embodiment, an image may be analyzed to determine a distribution of intensities for one or more components of the image. An overall gain and/or offset may be determined for the image based on such a distribution, for example, and used to adjust the distribution so that it matches an expected (e.g., corrected) or desired (e.g., targeted) distribution. In other embodiments, an overall gain and/or offset may be determined so that a particular interval of the distribution utilizes more of the dynamic range of the particular component or components of the image.

In some embodiments, a dynamic range of a first image (e.g., a radiometric component of an infrared image) may be normalized to the dynamic range of a second image (e.g., a luminance component of a visible spectrum image). In other embodiments, a dynamic range of a particular image may be adjusted according to a histogram equalization method, a linear scaling method, or a combination of the two, for example, to distribute the dynamic range according to information contained in a particular image or selection of images.

In further embodiments, adjustments and/or normalizations of dynamic ranges or other aspects of images may be performed while retaining a calibration of a radiometric component of an infrared image. For example, a dynamic range of a non-radiometric component of an infrared image may be adjusted without adjusting the dynamic range of the radiometric component of infrared image. In other embodiments, the radiometric component of an infrared image may be adjusted to emphasize a particular thermal interval, for example, and the adjustment may be stored with the infrared image so that accurate temperature correspondence (e.g., a pseudo-color and/or intensity correspondence) may be presented to a user along with a user-viewable image corresponding to the thermal image and/or a combined image including infrared characteristics derived from the infrared image.

In other embodiments, preprocessing operations may include converting visible spectrum and/or infrared images to a different or common color space. In other embodiments, images in a raw or uncompressed format may be converted to a common RGB or YCbCr color space. In some embodiments, a pseudo-color palette, such as a pseudo-color palette chosen by a user in block 4102, may be applied as part of the preprocessing operations performed in block 4120. As with the dynamic range adjustments, application of color palettes may be performed while retaining a calibration of a radiometric component of an infrared image, for example, or a color space calibration of a visible spectrum image.

In another embodiment, preprocessing operations may include decomposing images into various components. For example, an infrared image in a color space/for mat including a raw or uncompressed radiometric component may be converted into an infrared image in a YCbCr color space. The raw radiometric component may be encoded into a luminance (e.g., Y) component of the converted infrared image, for example, or into a chrominance (e.g., Cr and/or Cb) component of the converted infrared image, or into the luminance and chrominance components of the converted infrared image. In some embodiments, unused components may be discarded, for example, or set to a known value (e.g., black, white, grey, or a particular primary color). Visible spectrum images may also be converted and decomposed into constituent components, for example, in a similar fashion. The decomposed images may be stored in place of the original images, for example, and may include context data indicating all color space conversions and decompositions so as to potentially retain a radiometric and/or color space calibration of the original images.

More generally, preprocessed images may be stored in place of original images, for example, and may include context data indicating all applied preprocessing operations so as to potentially retain a radiometric and/or color space calibration of the original images.

At block 4130, system 4000 may generate one or more combined images from the captured and/or preprocessed images. For example, one or more of imaging modules 4002*a-b* and/or processor 4010 (or, if desired, a processor of a releasably attached user device) may be configured to generate combined images of scene 4030 from visible spectrum and infrared images captured by imaging modules 4002*a-b*. In one embodiment, the visible spectrum images may be captured prior to the infrared images. In an alternative embodiment, the infrared images may be captured prior to the visible spectrum images. Such combined images may serve to provide enhanced imagery as compared to imagery provided by the visible spectrum or infrared images alone.

In one embodiment, processor 4010 may be configured to generate combined images according to a true color mode. For example, a combined image may include a radiometric component of an infrared image of scene 4030 blended with a corresponding component of a visible spectrum image according to a blending parameter. In such embodiments, the remaining portions of the combined image may be derived from corresponding portions of the visible spectrum and/or infrared images of scene 4030.

In another embodiment, processor 4010 may be configured to generate combined images according to a high contrast mode. For example, a combined image may include a radiometric component of an infrared image and a blended component including infrared characteristics of scene 4030 blended with high spatial frequency content, derived from visible spectrum and/or infrared images, according to a blending parameter.

More generally, processor 4010 may be configured to generate combined images that increase or refine the information conveyed by either the visible spectrum or infrared images viewed by themselves. Combined images may be stored in memory 4012, for example, for subsequent post-processing and/or presentation to a user or a monitoring system, for instance, or may be used to generate control signals for one or more other components 4018.

At block 4140, system 4000 may perform a variety of post-processing operations on combined images. For example, one or more of imaging modules 4002*a-b* and/or processor 4010 may be configured to perform one or more post-processing operations on combined images generated from visible spectrum and infrared characteristics of scene 4030, for example, derived from images captured by imaging modules 4002*a-b*.

Similar to the preprocessing operations described with respect to block 4120, post-processing operations may include a variety of numerical, bit, and/or combinatorial operations performed on all or a portion of an image, such as on a component of an image, for example, or a selection of pixels of an image, or on a selection or series of images. For example, any of the dynamic range adjustment operations described above with respect to preprocessing operations performed on captured images may also be performed on one or more combined images. In one embodiment, a particular color-palette, such as a night or day-time palette, or a pseudo-color palette, may be applied to a combined image. For example, a particular color-palette may be designated by a user in block 4102, or may be determined by context or other data, such as a current time of day, a type of combined image, or a dynamic range of a combined image.

In other embodiments, post-processing operations may include adding high resolution noise to combined images in order to decrease an impression of smudges or other artifacts potentially present in the combined images. In one embodiment, the added noise may include high resolution temporal noise (e.g., "white" signal noise). In further embodiments, post-processing operations may include one or more noise reduction operations to reduce or eliminate noise or other non-physical artifacts introduced into the combined images by image processing, for example, such as aliasing, banding, dynamic range excursion, and numerical calculation-related bit-noise.

In some embodiments, post-processing operations may include color-weighted (e.g., chrominance-weighted) adjustments to luminance values of an image in order to ensure that areas with extensive color data are emphasized over areas without extensive color data. For example, where a radiometric component of an infrared image is encoded into a chrominance component of a combined image, in block 4130, for example, a luminance component of the combined image may be adjusted to increase the luminance of areas of the combined image with a high level of radiometric data. A high level of radiometric data may correspond to a high temperature or temperature gradient, for example, or an area of an image with a broad distribution of different intensity infrared emissions (e.g., as opposed to an area with a narrow or unitary distribution of intensity infrared emissions). Other normalized weighting schemes may be used to shift a luminance component of a combined image for pixels with significant color content. In alternative embodiments, luminance-weighted adjustments to chrominance values of an image may be made in a similar manner.

More generally, post-processing operations may include using one or more components of a combined image to adjust other components of a combined image in order to provide automated image enhancement. In some embodiments, post-processing operations may include adjusting a dynamic range, a resolution, a color space/format, or another aspect of combined images to match or approximate a corresponding aspect of a display, for example, or a corresponding aspect expected by a monitoring system or selected by a user.

Post-processed combined images may be stored in place of original combined images, for example, and may include context data indicating all applied post-processing operations so as to potentially retain a radiometric and/or color space calibration of the original combined images.

At block 4150, system 4000 may generate control signals related to the combined images. For example, processor 4010 may be configured to generate control signals adapted to energize and/or operate any of an alarm, a siren, a messaging system, a security light, or one or more of other components 4018, according to conditions detected from the enhanced imagery provided by the combined images. Such control signals may be generated when a combined image contains a detected object or condition, such as one or more of pedestrians 4050 and/or vehicle 4040 entering or idling in scene 4030, for example. In other embodiments, processor 4010 may be configured to generate control signals notifying a monitoring system of detected objects or conditions in scene 4030.

At block 4152, system 4000 may display images to a user. For example, processor 4010 may be configured to convert visible spectrum, infrared, and/or combined images (e.g., from block 4130 and/or 4140) into user-viewable combined images and present the user-viewable combined images to a user utilizing display 4016. In other embodiments, processor 4010 may also be configured to transmit combined images, including user-viewable combined images, to a monitoring system (e.g., using communication module 4014) for further processing, notification, control signal generation, and/or display to remote users. As noted above, embodiments of process 4100 may include additional embodiments of block 4152, for example. In some embodiments, one or more embodiments of block 4152 may be implemented as part of one or more feedback loops, for example, which may include embodiments of blocks 4102 and/or 4104.

At block 4154, system 4000 may store images and other associated data. For example, processor 4010 may be configured to store one or more of the visible spectrum, infrared, or combined images, including associated context data and other data indicating pre-and-post-processing operations, to memory 4012, for example, or to an external or portable memory device.

Figure 36:
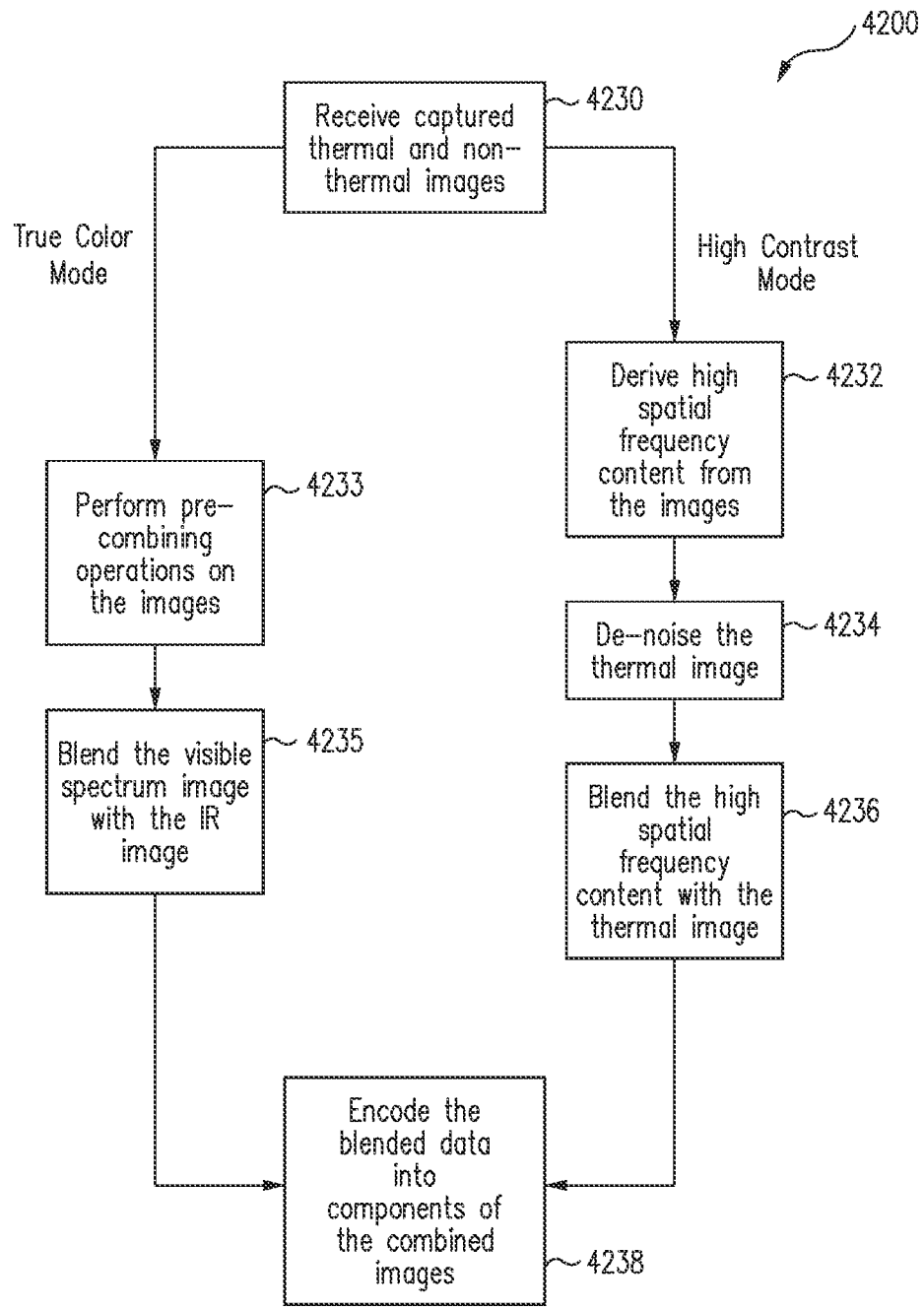
FIG. 36 illustrates a flow diagram of various operations to combine thermal images and non-thermal images in accordance with an embodiment of the disclosure.

FIG. 36 illustrates a flowchart of a process 4200 to combine thermal images and non-thermal images of a scene in accordance with an embodiment of the disclosure. For example, one or more portions of process 4200 may be performed by processor 4010 and/or each of imaging modules 4002*a-b* of system 4000 and utilizing any of optical elements 4004*a-b*, memory 4012, communication module 4014, display 4016, or other components 4018, where each of imaging modules 4002*a-b* and/or optical elements 4004*a-b* may be mounted in view of at least a portion of scene 4030. In some embodiments, process 4200 may be implemented as an embodiment of block 6204 in process 6200 of FIG. 27, for example, to generate processed images such as multi-spectrum images from captured thermal infrared images and non-thermal images captured in block 6202 in process 6200.

It should also be appreciated that any step, sub-step, sub-process, or block of process 4200 may be performed in an order or arrangement different from the embodiment illustrated by FIG. 36. For example, although process 4200 describes distinct blending and high-contrast modes, in other embodiments, captured images may be combined using any portion, order, or combination of the blending and/or high-contrast mode processing operations. In some embodiments, any portion of process 4200 may be implemented in a loop so as to continuously operate on a series of infrared and/or visible spectrum images, such as a video of a scene.

At block 4230, processor 4010 may receive captured thermal images and non-thermal images (e.g., thermal infrared images and visible spectrum images). The thermal images and non-thermal images may be captured in various manners described for block 6202 of process 6200, for example. Once the captured thermal images and non-thermal images are received, processor 4010 may determine a mode for generating combined images. Such mode may be selected by a user in block 4102 of FIG. 35, for example, or may be determined according to context data or an alternating mode, for instance, where the mode of operation alternates between configured modes upon a selected schedule or a particular monitoring system expectation.

In the embodiment illustrated by FIG. 36, the processor may determine a true color mode, including one or more of blocks 4233 and 4235, or a high contrast mode, including one or more of blocks 4232, 4234, and 4236. In other embodiments, process 4200 may include other selectable modes including processes different from those depicted in FIG. 36, for example, or may include only a single mode, such as a mode including one or more adjustable blending parameters. In embodiments with multiple possible modes, once a mode is determined, process 4200 may proceed with the selected mode.

At block 4233, system 4000 may perform various pre-combining operations on one or more of the thermal images and non-thermal images. For example, if a true color mode is determined in block 4230, processor 4010 may be configured to perform pre-combining operations on one or more thermal images and/or non-thermal images received in block 4230. In one embodiment, pre-combining operations may include any of the pre-processing operations described with respect to block 4120 of FIG. 35. For example, the color spaces of the received images may be converted and/or decomposed into common constituent components.

In other embodiments, pre-combining operations may include applying a high pass filter, applying a low pass filter, a non-linear low pass filer (e.g., a median filter), adjusting dynamic range (e.g., through a combination of histogram equalization and/or linear scaling), scaling dynamic range (e.g., by applying a gain and/or an offset), and adding image data derived from these operations to each other to form processed images. For example, a pre-combining operation may include extracting details and background portions from a radiometric component of an infrared image using a high pass spatial filter, performing histogram equalization and scaling on the dynamic range of the background portion, scaling the dynamic range of the details portion, adding the adjusted background and details portions to faint a processed infrared image, and then linearly mapping the dynamic range of the processed infrared image to the dynamic range of a display. In one embodiment, the radiometric component of the infrared image may be a luminance component of the infrared image. In other embodiments, such pre-combining operations may be performed on one or more components of visible spectrum images.

As with other image processing operations, pre-combining operations may be applied in a manner so as to retain a radiometric and/or color space calibration of the original received images. Resulting processed images may be stored and/or may be further processed according to block 4235.

At block 4235, processor 4010 may blend one or more non-thermal (e.g., visible spectrum images or other non-thermal images) with one or more thermal images. For example, processor 4010 may be configured to blend one or more visible spectrum images with one or more thermal infrared images, where the one or more visible spectrum and/or thermal infrared images may be processed versions (e.g., according to block 4233) of images originally received in block 4230.

In one embodiment, blending may include adding a radiometric component of an infrared image to a corresponding component of a visible spectrum image, according to a blending parameter. For example, a radiometric component of an infrared image may be a luminance component (e.g., Y) of the infrared image. In such an embodiment, blending the infrared image with a visible spectrum image may include proportionally adding the luminance components of the images according to a blending parameter and the following first blending equation:

$$YCI=\zeta *YVSI+(1-\zeta)*YIRI$$

where YCI is the luminance component of the combined image, YVSI is the luminance of the visible spectrum image, YIRI is the luminance component of the infrared image, and $\zeta$ varies from 0 to 1. In this embodiment, the resulting luminance component of the combined image is the blended image data.

In other embodiments, where a radiometric component of an infrared image may not be a luminance component of the infrared image, blending an infrared image with a visible spectrum image may include adding chrominance components of the images according to the first blending equation (e.g., by replacing the luminance components with corresponding chrominance components of the images), and the resulting chrominance component of the combined image is blended image data. More generally, blending may include adding (e.g., proportionally) a component of an infrared image, which may be a radiometric component of the infrared image, to a corresponding component of a visible spectrum image. Once blended image data is derived from the components of the visible spectrum and infrared images, the blended image data may be encoded into a corresponding component of the combined image, as further described with respect to block 4238. In some embodiments, encoding blended image data into a component of a combined image may include additional image processing steps, for example, such as dynamic range adjustment, normalization, gain and offset operations, and color space conversions, for instance.

In embodiments where radiometric data is encoded into more than one color space/format component of an infrared image, the individual color space/format components of the infrared and visible spectrum images may be added individually, for example, or the individual color space components may be arithmetically combined prior to adding the combined color space/format components.

In further embodiments, different arithmetic combinations may be used to blend visible spectrum and infrared images. For example, blending an infrared image with a visible spectrum image may include adding the luminance components of the images according to a blending parameter $\zeta$ and the following second blending equation:

$$YCI=\zeta *YVSI+YIRI$$

where YCI, YVSI, and YIRI are defined as above with respect to the first blending equation, and $\zeta$ varies from 0 to values greater than a dynamic range of an associated image component (e.g., luminance, chrominance, radiometric, or other image component). As with the first blending equation, the second blending equation may be used to blend other components of an infrared image with corresponding components of a visible spectrum image. In other embodiments, the first and second blending equations may be rewritten to include per-pixel color-weighting or luminance-weighting adjustments of the blending parameter, for example, similar to the component-weighted adjustments described with respect to block 4140 of FIG. 35, in order to emphasize an area with a high level of radiometric data.

In some embodiments, image components other than those corresponding to a radiometric component of an infrared image may be truncated, set to a known value, or discarded. In other embodiments, the combined image components other than those encoded with blended image data may be encoded with corresponding components of either the visible spectrum or the infrared images. For example, in one embodiment, a combined image may include a chrominance component of a visible spectrum image encoded into a chrominance component of the combined image and blended image data encoded into a luminance component of the combined image, where the blended image data comprises a radiometric component of an infrared image blended with a luminance component of the visible spectrum image. In alternative embodiments, a combined image may include a chrominance component of the infrared image encoded into a chrominance component of the combined image.

A blending parameter value may be selected by a user, or may be determined by the processor according to context or other data, for example, or according to an image enhancement level expected by a coupled monitoring system. In some embodiments, the blending parameter may be adjusted or refined using a knob, joystick, or keyboard coupled to the processor, for example, while a combined image is being displayed by a display. From the first and second blending equations, in some embodiments, a blending parameter may be selected such that blended image data includes only infrared characteristics, or, alternatively, only visible spectrum characteristics.

In addition to or as an alternative to the processing described above, processing according to a true color mode may include one or more processing steps, ordering of processing steps, arithmetic combinations, and/or adjustments to blending parameters as disclosed in U.S. patent application Ser. No. 12/477,828 filed Jun. 3, 2009 which is hereby incorporated by reference in its entirety. For example, blending parameter $\zeta$ may be adapted to affect the proportions of two luminance components of an infrared image and a visible spectrum image. In one aspect, $\zeta$ may be normalized with a value in the range of 0 (zero) to 1, wherein a value of 1 produces a blended image (e.g., blended image data, and/or a combined image) that is similar to the visible spectrum image. On the other hand, if ζ is set to 0, the blended image may have a luminance similar to the luminance of the infrared image. However, in the latter instance, the chrominance (Cr and Cb) from the visible image may be retained. Each other value of ζ may be adapted to produce a blended image where the luminance part (Y) includes information from both the visible spectrum and infrared images. For example, ζ may be multiplied to the luminance part (Y) of the visible spectrum image and added to the value obtained by multiplying the value of 1−ζ to the luminance part (Y) of the infrared image. This added value for the blended luminance parts (Y) may be used to provide the blended image (e.g., the blended image data, and/or the combined image).

In one embodiment, a blending algorithm may be referred to as true color infrared imagery. For example, in daytime imaging, a blended image may comprise a visible spectrum color image, which includes a luminance element and a chrominance element, with its luminance value replaced by the luminance value from a thermal infrared image. The use of the luminance data from the thermal infrared image causes the intensity of the true visible spectrum color image to brighten or dim based on the temperature of the object. As such, the blending algorithm provides thermal IR imaging for daytime or visible light images.

After one or more visible spectrum images (or other non-thermal images) are blended with one or more infrared images such as thermal images, processing may proceed to block 4238, where blended data may be encoded into components of the combined images in order to form the combined images.

At block 4232, processor 4010 may derive high spatial frequency content from one or more of the thermal images and non-thermal images. For example, if a high contrast mode is determined in block 4230, processor 4010 may be configured to derive high spatial frequency content from one or more of the thermal images and non-thermal images received in block 4230.

In one embodiment, high spatial frequency content may be derived from an image by performing a high pass filter (e.g., a spatial filter) operation on the image, where the result of the high pass filter operation is the high spatial frequency content. In an alternative embodiment, high spatial frequency content may be derived from an image by performing a low pass filter operation on the image, and then subtracting the result from the original image to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements of a camera may be configured to introduce vibration, focus/de-focus, and/or movement artifacts into a series of images captured by one or both of an infrared camera and a non-thermal camera. High spatial frequency content may be derived from subtractions of adjacent or semi-adjacent images in the series.

In some embodiments, high spatial frequency content may be derived from only the non-thermal images or only from the thermal images. In other embodiments, high spatial frequency content may be derived from only a single thermal or non-thermal image. In further embodiments, high spatial frequency content may be derived from one or more components of thermal images and/or non-thermal images, such as a luminance component of a visible spectrum image, for example, or a radiometric component of a thermal infrared image. Resulting high spatial frequency content may be stored temporarily and/or may be further processed according to block 4234.

At block 4234, processor 4010 may de-noise one or more thermal images. For example, processor 4010 may be configured to de-noise, smooth, or blur one or more infrared images using a variety of image processing operations. In one embodiment, removing high spatial frequency noise from thermal images allows processed thermal images to be combined with high spatial frequency content derived according to block 4232 with significantly less risk of introducing double edges (e.g., edge noise) to objects depicted in combined images.

In one embodiment, removing noise from thermal images may include performing a low pass filter (e.g., a spatial and/or temporal filter) operation on the image, where the result of the low pass filter operation is a de-noised or processed thermal image. In a further embodiment, removing noise from one or more thermal images may include down-sampling the thermal images and then up-sampling the images back to the original resolution.

In another embodiment, processed thermal images may be derived by actively blurring thermal images. For example, optical elements 4004b may be configured to slightly de-focus one or more thermal images captured by infrared imaging module 4002b. The resulting intentionally blurred thermal images may be sufficiently de-noised or blurred so as to reduce or eliminate a risk of introducing double edges into combined images, as further described below. In other embodiments, blurring or smoothing image processing operations may be performed by processor 4010 on thermal images received at block 4230 as an alternative or supplement to using optical elements 4004b to actively blur infrared images. Resulting processed infrared images may be stored temporarily and/or may be further processed according to block 4236.

At block 4236, processor 4010 may blend high spatial frequency content with one or more thermal images. For example, the processor may be configured to blend high spatial frequency content derived in block 4232 with one or more thermal images, such as the processed thermal images provided in block 4234.

In one embodiment, high spatial frequency content may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images, but may not exist within the interior of such objects. In such embodiments, blended image data may simply include the high spatial frequency content, which may subsequently be encoded into one or more components of combined images, as described in block 4238.

For example, a radiometric component of a thermal image may be a chrominance component of the thermal image, and the high spatial frequency content may be derived from the luminance and/or chrominance components of a visible spectrum image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

In other embodiments, high spatial frequency content may be derived from one or more particular components of one or a series of non-thermal images and/or thermal images, and the high spatial frequency content may be encoded into corresponding one or more components of combined images. For example, the high spatial frequency content may be derived from a luminance component of a visible spectrum image, and the high spatial frequency content, which in this embodiment is all luminance image data, may be encoded into a luminance component of a combined image.

In another embodiment, high spatial frequency content may be blended with thermal images using a blending parameter and an arithmetic equation, such as the first and second blending equations, above. For example, in one embodiment, the high spatial frequency content may be derived from a luminance component of a visible spectrum image. In such an embodiment, the high spatial frequency content may be blended with a corresponding luminance component of a thermal image according to a blending parameter and the second blending equation to produce blended image data. The blended image data may be encoded into a luminance component of a combined image, for example, and the chrominance component of the thermal image may be encoded into the chrominance component of the combined image. In embodiments where the radiometric component of the infrared image is its chrominance component, the combined image may retain a radiometric calibration of the thermal image. In other embodiments, portions of the radiometric component may be blended with the high spatial frequency content and then encoded into a combined image.

More generally, the high spatial frequency content may be derived from one or more components of a thermal image and/or a non-thermal image. In such an embodiment, the high spatial frequency content may be blended with one or more components of the thermal image to produce blended image data (e.g., using a blending parameter and a blending equation), and a resulting combined image may include the blended image data encoded into corresponding one or more components of the combined image. In some embodiments, the one or more components of the blended data do not have to correspond to the eventual one or more components of the combined image (e.g., a color space/format conversion may be performed as part of an encoding process).

A blending parameter value may be selected by a user or may be automatically determined by the processor according to context or other data, for example, or according to an image enhancement level expected by a coupled monitoring system. In some embodiments, the blending parameter may be adjusted or refined using a control component (e.g., a switch, button, or touch screen) of system 4000, for example, while a combined image is being displayed by display 4016. In some embodiments, a blending parameter may be selected such that blended image data includes only thermal characteristics, or, alternatively, only non-thermal characteristics. A blending parameter may also be limited in range, for example, so as not to produce blended data that is out-of-bounds with respect to a dynamic range of a particular color space/format or a display.

In addition to or as an alternative to the processing described above, processing according to a high contrast mode may include one or more processing steps, ordering of processing steps, arithmetic combinations, and/or adjustments to blending parameters as disclosed in U.S. patent application Ser. No. 13/437,645 filed Apr. 2, 2012 which is hereby incorporated by reference in its entirety. For example, the following equations may be used to determine the components Y, Cr and Cb for the combined image with the Y component from the high pass filtered visible spectrum image and the Cr and Cb components from the thermal image.

$hp\_y\_vis = \text{highpass}(y\_vis)$ $(y\_ir, cr\_ir, cb\_ir) = \text{colored}(\text{lowpass}(ir\_signal\_linear))$ which in another notation could be written as:

$hp_{y_{vis}} = \text{highpass}(y_{vis})$ $(y_{ir}, cr_{ir}, cb_{ir}) = \text{colored}(\text{lowpass}(ir_{signal\ linear}))$ In the above equations, highpass(y_vis) may be high spatial frequency content derived from high pass filtering a luminance component of a visible spectrum image. Colored (lowpass(ir_signal_linear)) may be the resulting luminance and chrominance components of the thermal image after the thermal image is low pass filtered. In some embodiments, the thermal image may include a luminance component that is selected to be 0.5 times a maximum luminance (e.g., of a display and/or a processing step). In related embodiments, the radiometric component of the thermal image may be the chrominance component of the thermal image. In some embodiments, the y_ir component of the thermal image may be dropped and the components of the combined image may be (hp_y_vis, cr_ir, cb_ir), using the notation above.

In another embodiment, the following equations may be used to determine the components Y, Cr and Cb for a combined image with the Y component from the high pass filtered visible spectrum image and the Cr and Cb components from the thermal image.

$comb\_y = y\_ir + \text{alpha} \times hp\_y\_vis$ $comb\_cr = cr\_ir$ $comb\_cb = cb\_ir$ which in another notation could be written as:

$comb_y = y_{ir} + \text{alpha} * hp_{y_{vis}}$ $comb_{cr} = cr_{ir}$ $comb_{cb} = cb_{ir}$ The variation of alpha thus gives the user an opportunity to decide how much contrast is needed in the combined image. With an alpha of close to zero, the thermal image alone will be shown, but with a very high alpha, very sharp contours can be seen in the combined image. Theoretically, alpha can be an infinitely large number, but in practice a limitation will probably be necessary, to limit the size of alpha that can be chosen to what will be convenient in the current application. In the above equations, alpha may correspond to a blending parameter $\zeta$.

Once the high spatial frequency content is blended with one or more thermal images, processing may proceed to block 4238, where blended data may be encoded into components of the combined images in order to form the combined images.

At block 4238, processor 4010 may encode the blended data into one or more components of the combined images. For example, processor 4010 may be configured to encode blended data derived or produced in accordance with blocks 4235 and/or 4236 into a combined image that increases, refines, or otherwise enhances the information conveyed by either the thermal images or non-thermal images viewed by themselves.

In some embodiments, encoding blended image data into a component of a combined image may include additional image processing steps, for example, such as dynamic range adjustment, normalization, gain and offset operations, noise reduction, and color space conversions, for instance.

In addition, processor 4010 may be configured to encode other image data into combined images. For example, if blended image data is encoded into a luminance component of a combined image, a chrominance component of either a non-thermal image or a thermal image may be encoded into a chrominance component of a combined image. Selection of a source image may be made through user input, for example, or may be determined automatically based on context or other data. More generally, in some embodiments, a component of a combined image that is not encoded with blended data may be encoded with a corresponding component of a thermal image or a non-thermal image. By doing so, a radiometric calibration of a thermal image and/or a color space calibration of a visible spectrum image may be retained in the resulting combined image, for example. Such calibrated combined images may be used for enhanced thermal infrared imaging applications, particularly where constituent thermal images and non-thermal images of a scene are captured at different times and/or disparate ambient lighting levels.

Figure 37:
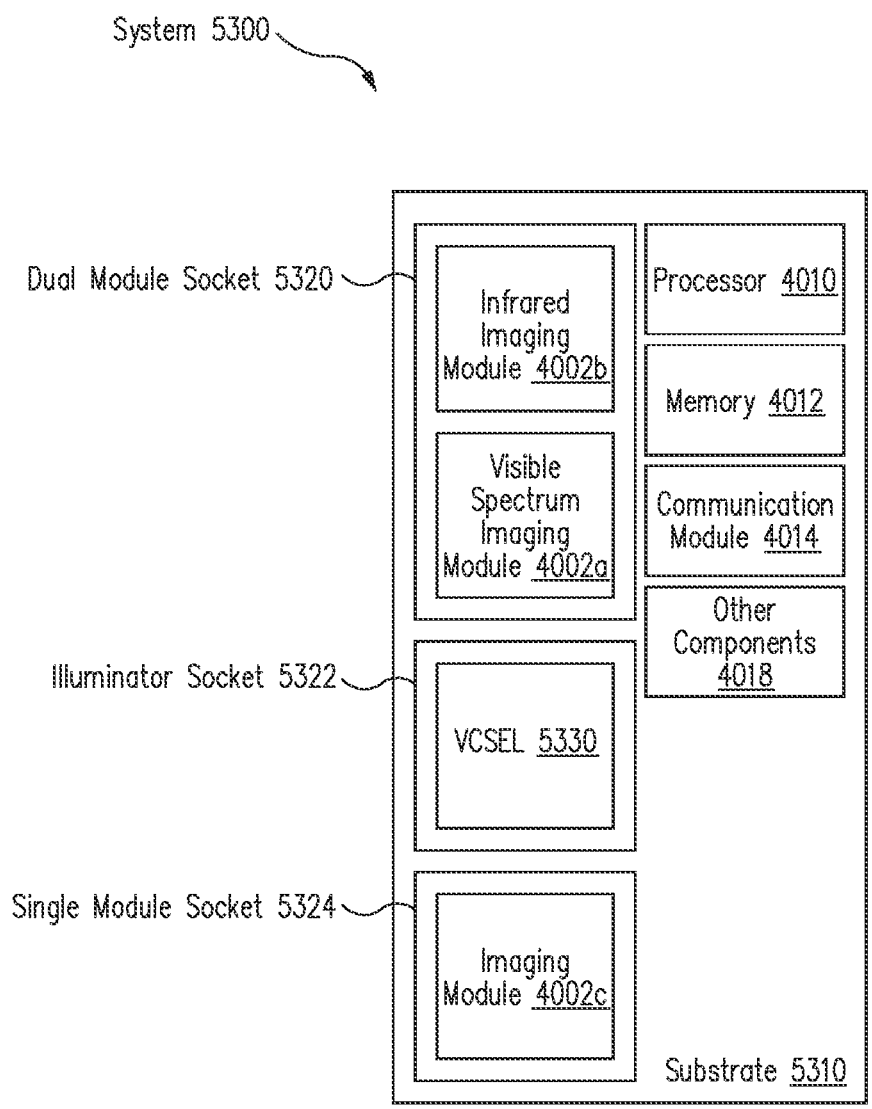
FIG. 37 illustrates a block diagram of an imaging system adapted to image a scene in accordance with an embodiment of the disclosure.

Referring now to FIG. 37, a block diagram is illustrated of a compact imaging system 5300 adapted to image a scene in accordance with an embodiment of the disclosure. For example, system 5300 may include imaging modules 4002a-c (e.g., all of which may be implemented, for example, with any of the features of infrared imaging module 100) all physically coupled to common substrate 5310 and adapted to image a scene (e.g., scene 4030 in FIG. 34) in a variety of spectrums. In some embodiments, processor 4010, memory 4012, communication module 4014, and one or more other components 4018 may or may not be physically coupled to common substrate 5310.

In the embodiment shown in FIG. 37, system 5300 includes dual module socket 5320 physically coupled to common substrate 5310 and adapted to receive two imaging modules 4002a-b and align them to each other. In some embodiments, dual module socket 5320 may include features similar to those found in socket 104 of FIG. 3. In further embodiments, dual module socket 5320 may include retainer springs, clips, or other physical restraint devices adapted to visibly indicate proper insertion of imaging modules through their physical arrangement or shape. In further embodiments, dual module socket 5320 may be adapted to provide one or more of tip, tilt, or rotational alignment of imaging modules 4002a-b that is greater (e.g., more aligned) than if the imaging modules are directly soldered to common substrate 5310 or if they are inserted into multiple single module sockets. Dual module socket 5320 may include common circuitry and/or common restrain devices used to service imaging modules 4002a-b, thereby potentially reducing an overall size of system 5300 as compared to embodiments where imaging modules 4002a-b have individual sockets. Additionally, dual module socket 5320 may be adapted to reduce a parallax error between images captured by imaging modules 4002a-b by spacing the imaging modules closer together.

Also shown is single module socket 5324 receiving imaging module 4002c spaced from dual module socket 5320 and imaging modules 4002a-b. Imaging module 4002c may be sensitive to a spectrum that is the same as, that overlaps, or is different from that sensed by either or both of imaging modules 4002a-b, for example. In embodiments where imaging module 4002c is sensitive to a spectrum in common with either of imaging modules 4002a-b, system 5300 may be adapted to capture additional images of a commonly viewed scene and image portions of the scene in stereo (e.g., 3D) in that spectrum. In such embodiments, the spatial distance between imaging module 4002c and either of imaging modules 4002a-b increases the acuity of the stereo imaging by increasing the parallax error. In some embodiments, system 5300 may be configured to generate combined images including stereo imaging characteristics of a commonly-viewed scene derived from one or more images captured by imaging modules 4002a-c. In other embodiments, stereo imaging may be used to determine distances to objects in a scene, to determine autofocus parameters, to perform a range calculation, to automatically adjust for parallax error, to generate images of range-specific atmospheric adsorption of infrared and/or other spectrums in a scene, and/or for other stereo-imaging features.

In embodiments where imaging module 4002c is sensitive to a spectrum outside that sensed by imaging modules 4002a-b, system 5300 may be configured to generate combined images including characteristics of a scene derived from three different spectral views of the scene. In such embodiments, highly accurate facial recognition operations may be performed using multi-spectrum images or combined images of a human face.

Although system 5300 is depicted with dual module socket 5320 separate from single module socket 5324, in other embodiments, system 5300 may include a triple (or higher order) module socket adapted to receive three or more imaging modules. Moreover, where planar compactness is desired, adjacent modules may be arranged in a multi-level staggered arrangement such that their optical axes are placed closer together than their planar area would normally allow. For example, dual module socket 5320 may be adapted to receive visible spectrum imaging module 4002a on a higher (e.g., up out of the page of FIG. 37) level than infrared imaging modules 4002b and overlap non-optically sensitive areas of infrared imaging module 4002b.

Additionally shown in FIG. 37 is illuminator socket 5322 receiving illuminator module/vertical-cavity surface-emitting laser (VCSEL) 5330. System 5300 may be configured to use VCSEL 5330 to illuminate at least portions of a scene in a spectrum sensed by one or more of imaging modules 4002a-c. In some embodiments, VCSEL 5330 may be selectively tunable and/or directionally aimed by coupled microelectromechanical lenses and other systems controlled by one or more of processor 4010 and imaging modules 4002a-c. Illuminator socket 5322 may be implemented to have the same or similar construction as single module socket 5324, for example, or may be implemented as a multi-module socket. In some embodiments, a thermal image may be used to detect a "hot" spot in an image, such as an image of a breaker box. An illuminator module may be used to illuminate a label of a breaker to potentially pin point the cause of the hot spot. In other embodiments, an illuminator module may facilitate long range license plate imaging, particularly when the illuminator is relatively collimated laser light source. In some embodiments, stereo imaging may be used to determine aiming points for VCSEL 5330.

In some embodiments, any one of processor 4010 and imaging modules 4002*a-c* may be configured to receive user input (e.g., from one or more of other components 4018, a touch sensitive display coupled to system 5300, and/or any of the various user input devices discussed herein) indicating a portion of interest imaged by a first imaging module (e.g., infrared imaging module 4002*b*), control the illumination module (e.g., VCSEL 5330) to illuminate at least the portion-of-interest in a spectrum sensed by a second imaging module (e.g., visible spectrum imaging module 4002*a*), receive illuminated captured images of the portion-of-interest from the second imaging module, and generate a combined image comprising illuminated characteristics of the scene derived from the illuminated captured images.

Figure 38:
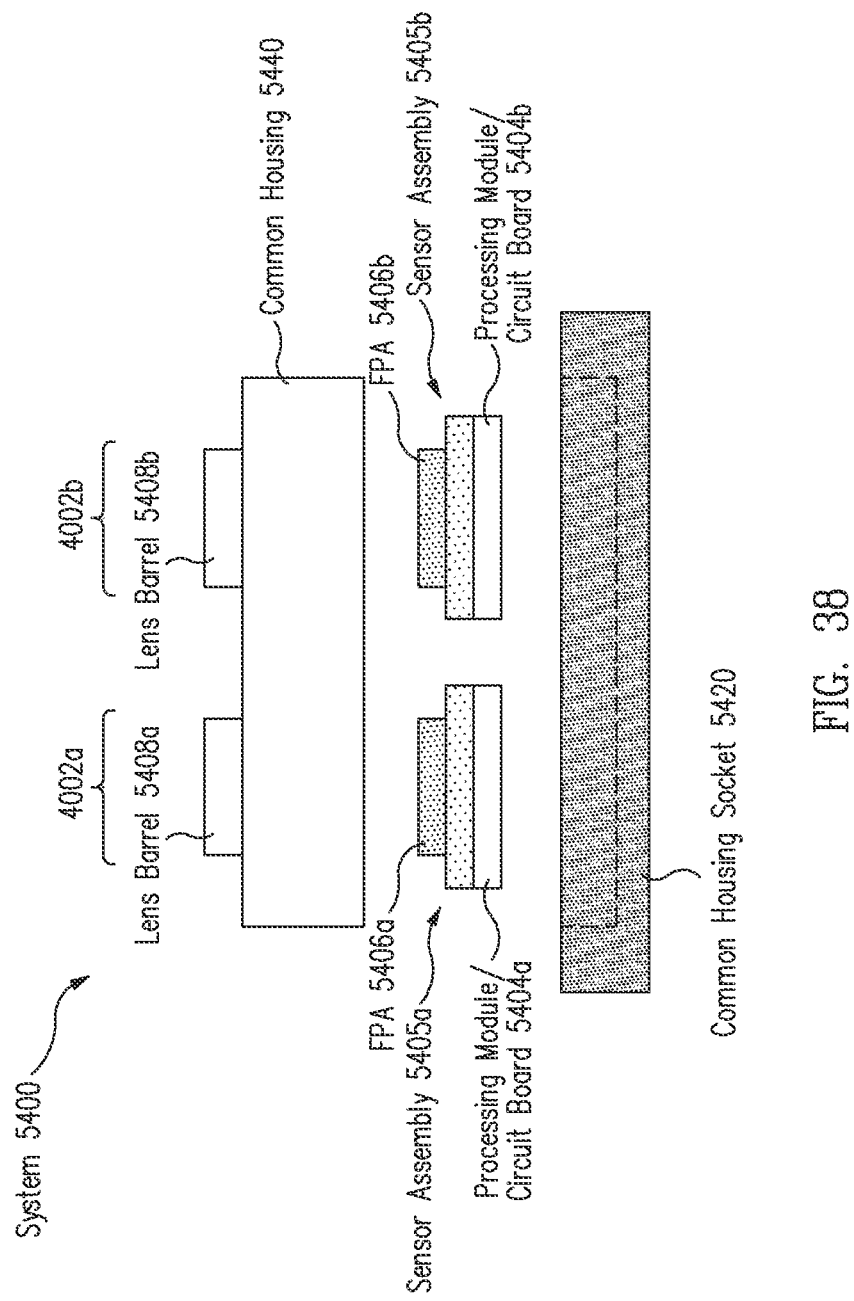
FIG. 38 illustrates a block diagram of a mounting system for imaging modules adapted to image a scene in accordance with an embodiment of the disclosure.

FIG. 38 illustrates a block diagram of a mounting system 5400 for imaging modules adapted to image a scene in accordance with an embodiment of the disclosure. For example, imaging modules 4002*a-b* may be implemented with a common housing 5440 (e.g., similar to housing 120 in FIG. 3, in some embodiments) to make their placement on substrate 5310 more compact and/or more aligned. As shown in FIG. 38, system 5400 may include common housing socket 5420, processing modules 5404*a-b*, sensor assemblies 5405*a-b*, FPAs 5406*a-b*, common housing 5440, and lens barrels 5408*a-b* (e.g., similar to lens barrel 110 in FIG. 3). Common housing 5440 may be used to further align, for example, components of imaging modules 4002*a-b* with their optical axes, rather than individual imaging modules. In the embodiment shown in FIG. 38, the imaging modules may retain separate optics (e.g., lens barrel 120 and optical elements 180 in FIG. 3) but be placed close together to minimize parallax error. In other embodiments, common housing 5440 may be placed over entire imaging modules 4002*a-b* (e.g., that retain their own individual housings), and may be part of a housing for a portable host device, for example.

Figure 39:
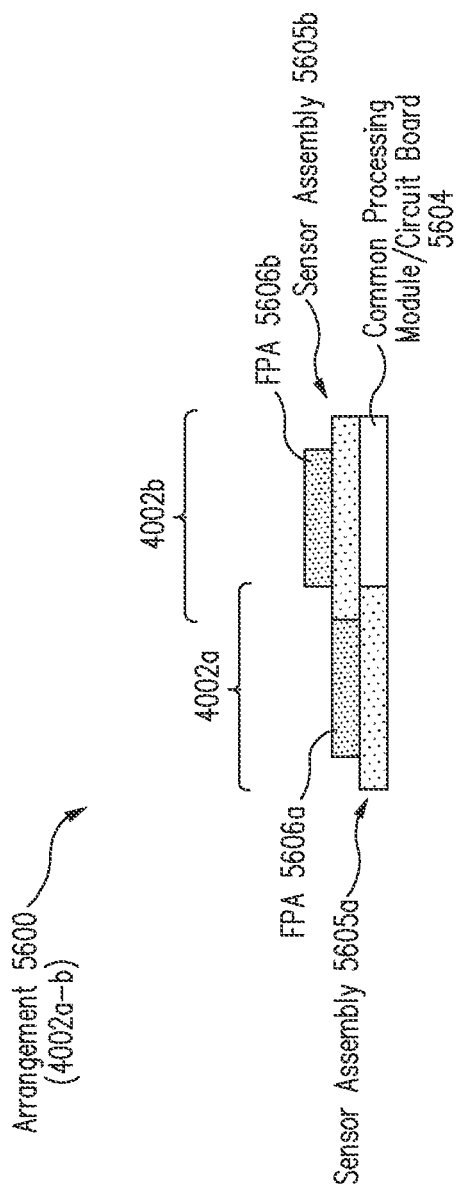
FIG. 39 illustrates a block diagram of an arrangement of an imaging module adapted to image a scene in accordance with an embodiment of the disclosure.

FIG. 39 illustrates a block diagram of an arrangement 5600 of imaging modules adapted to image a scene in accordance with an embodiment of the disclosure. For example, in FIG. 39, at least portions of two imaging modules 4002*a-b* may be arranged in a staggered arrangement, where portions of sensor assembly 5605*b* of imaging module 4002*b* (e.g., potentially including FPA 5606*b*) overlap portions of sensor assembly 5605*a* of imaging module 4002*a* (e.g., but not overlap any portion of FPA 5606*a*).

In some embodiments, imaging modules 4002*a-b* may be implemented with a common processing module/circuit board 5604 (e.g., similar to processing module 160 and circuit board 170 in FIG. 3, in some embodiments). Common processing module/circuit board 5604 may be implemented as any appropriate processing device (e.g., logic device, microcontroller, processor, ASIC, a digital signal processor (DSP), an image signal processor (ISP), or other device, including multi-channel implementations of the above) able to execute instructions and/or perform image processing operations as described herein. In some embodiments, common processing module/circuit board 5604 may be adapted to use the MIPI® standard, for example, and/or to store visible spectrum and infrared images to a common data file using a common data format, as described herein. In further embodiments, processor 4010 may be implemented as a common processing module.

Figure 40:
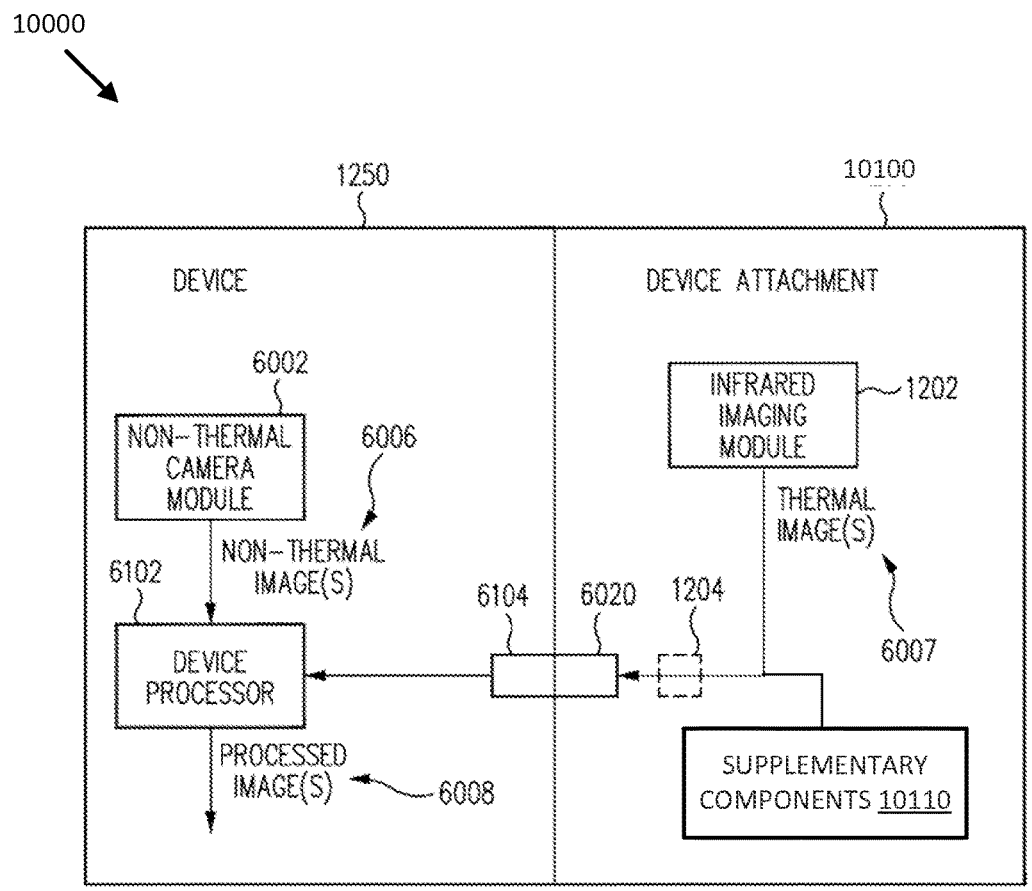
FIG. 40 illustrates a block diagram of an arrangement of an imaging module adapted to image a scene in accordance with an embodiment of the disclosure.

FIG. 40 illustrates an embodiment for device 10000 including device 1250 and a releasably attached device component such as device attachment 10100 (identified only for purposes of example; any of device attachments 1200, 1201, 1203, 2000, or others described herein may be used interchangeably in any of the embodiments described herein where appropriate) that may be used when it is desired to capture and combine non-thermal and/or thermal images. Furthermore, other arrangements of device 10000 are contemplated, such as those illustrated in FIGS. 25-26, but with the addition of supplementary components 10110 integrated with device attachment 10100.

Many of the components referenced in FIG. 40 are discussed and may be implemented similarly to those referred to in FIG. 24. In addition, as shown in FIG. 40, device attachment 10100 may include one or more supplementary components 10110. Supplementary components 10110 may include a variety of other types of sensors, such as ambient temperature sensors, ambient humidity sensors, contact patch moisture sensors, pin-type moisture sensors, laser range finders, active illuminators (e.g., visible spectrum, near infrared, far infrared, and/or multi-spectral illuminators, implemented with LEDs, diode lasers, VCSELs, and/or other components and/or devices), associated cabling, internal and/or external wired and/or wireless interfaces, and/or other types of sensors configured to supplement the functionality of device attachment 10100. Examples of such supplementary components and sensors are provided in U.S. patent application Ser. No. 11/841,036 filed Aug. 20, 2007 and entitled "MOISTURE METER WITH NON-CONTACT INFRARED THERMOMETER," and U.S. Patent Application U.S. Provisional Patent Application No. 61/938,388 filed Feb. 11, 2014 and entitled "MEASUREMENT DEVICE WITH THERMAL IMAGING CAPABILITIES AND RELATED METHODS," which are hereby incorporated by reference in their entirety.

For example, device attachment 10100 may be adapted to provide functionality beneficial to the typical use of a ventilation system inspector, which in some embodiments could include the functionality of an ambient humidity sensor and/or a contact patch and/or pin-type moisture sensor to detect moisture leaks within insulation of a ventilation system. In one embodiment, a user (e.g., a ventilation inspector specialist) could use device attachment 10100 with device 1250 to provide a compact handheld device that may be configured to detect thermal anomalies with infrared imaging module 1202 (e.g., as augmented by visible spectrum image data provided by non-thermal camera module 6002), detect ambient humidity anomalies with an ambient humidity sensor integrated with supplementary components 10110, and/or to detect moisture levels within insulation, drywall, and/or other material located at or near the temperature and/or ambient humidity anomalies with a wired, wireless, and/or integrated moisture sensor associated and/or integrated with supplementary components 10110. In other embodiments, other ventilation and/or environmental sensors may be wirelessly associated and/or integrated with supplementary components 10110. In various embodiments, device 1250 and/or device attachment 10100 may include other components, such as a GPS or other type of geo-spatial location sensors and/or orientation sensors, for example, such that device 10000 may be configured to link imaging data and supplementary sensor data to a particular location and/or orientation of device 10000.

In another example, device attachment 10100 may be adapted to provide functionality beneficial to the typical use of an electrical and/or electronics inspector, which in some embodiments could include the functionality of a digital oscilloscope, a voltage meter, current meter, Ohm meter (e.g., collectively a digital multi-meter), a spectrum analyzer, a variable band antenna, and/or other types of electronic or electrical systems sensor. In one embodiment, a user (e.g., an electrical or electronic systems inspector specialist) could use device attachment 10100 with device 1250 to provide a compact handheld device that may be configured to detect thermal anomalies with infrared imaging module 1202 (e.g., as augmented by visible spectrum image data provided by non-thermal camera module 6002), detect voltages, currents, signal transients, and/or other types of electrical and/or electronic anomalies in a device's electronic system or a building's electrical system with corresponding sensors associated and/or integrated with supplementary components 10110. In other embodiments, other electrical, electronic, and/or other physical parameter sensors may be wirelessly associated and/or integrated with supplementary components 10110. In various embodiments, device 1250 and/or device attachment 10100 may include geo-spatial location and/or orientation sensors, for example, such that device 10000 may be configured to link imaging data and supplementary sensor data to a particular location and/or orientation of device 10000.

As described herein, processing of the image, sensor, or other types of data provided by the various components illustrated in FIG. 40 may be performed by device processor 6102 and/or a device processor integrated with device attachment 10100, and/or a remote processor in communication with device 10000. In some embodiments, operation of a particular selection of supplementary components 10110 may be facilitated by an application executed by device processor 6102, for example, and displayed to a user using a display of device 1250. In further embodiments, device attachment 10100 may include one or more displays or indicators separate from a display of device 1250, for example, to supplement a display of device 1250 with data and/or other types of information or alerts associated with supplementary components 10110. In one embodiment, device 1250 may be implemented as a smart phone and be configured to execute an application downloaded from a server or from device attachment 10100 that facilitates use of non-thermal camera module 6002, infrared imaging module 1202, and/or supplementary components 10110, along with other functionality integrated with smart phone 1250 (e.g., network access, wireless interfaces, microphone, speaker, vibration actuator, accelerometer, gyroscope, user interfaces, random number generators, security devices, and/or other functionality integrated with a smart phone.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A device attachment comprising:
   a housing configured to releasably attach to a mobile user device to support mobile operation of the device attachment in conjunction with the mobile user device;
   an infrared sensor assembly within the housing, the infrared sensor assembly configured to capture thermal infrared image data of a scene;
   a supplementary component at least partially disposed within the housing, the supplementary component configured to generate sensor data associated with at least a portion of the scene; and
   a processing module communicatively coupled to the infrared sensor assembly and the supplementary component, the processing module configured to provide information associated with the thermal infrared image data and/or the sensor data to the user device for display by the mobile user device.

2. The device attachment of claim 1, further comprising a lens configured to pass infrared radiation through to the infrared sensor assembly.

3. The device attachment of claim 1, wherein the housing comprises a rear wall and at least one sidewall that form a recess configured to receive the mobile user device, wherein the mobile user device is a mobile personal electronic device, and wherein the supplementary component is selected from the group consisting of a moisture sensor configured to generate moisture level data associated with the portion of the scene and an electrical parameter sensor configured to generate electrical parameter data associated with the portion of the scene.

4. The device attachment of claim 1, wherein the processing module is configured to transmit the thermal infrared image data to the mobile user device in response to a request sent from the mobile user device.

5. The device attachment of claim 1, wherein:
   the thermal infrared image data comprises an intentionally blurred image frame and an unblurred image frame; and
   the processing module is configured to determine a plurality of non-uniformity correction (NUC) terms based on the intentionally blurred image frame and apply the NUC terms to the unblurred image frame to remove noise from the unblurred image frame.

6. The device attachment of claim 1, wherein:
   the infrared sensor assembly comprises a focal plane array (FPA) configured to capture the thermal infrared image data; and
   the FPA comprises an array of microbolometers adapted to receive a bias voltage selected from a range of approximately 0.2 volts to approximately 0.7 volts.

7. The device attachment of claim 1, further comprising a device connector configured to pass the thermal infrared image data from the processing module to the mobile user device.

8. The device attachment of claim 7, wherein the device connector is further configured to pass electrical power to the mobile user device for use by the mobile user device.

9. The device attachment of claim 1, further comprising a non-thermal camera module within the housing, the non-thermal camera module configured to capture non-thermal image data.

10. The device attachment of claim 9, wherein the non-thermal camera module comprises a visible-light camera module.

11. The device attachment of claim 9, wherein:
the non-thermal camera module is configured to capture the non-thermal image data from the scene at a first time;
the infrared sensor assembly is configured to capture the thermal infrared image data from the scene at a second time, wherein the thermal infrared image data comprises a radiometric component; and
the processing module is configured to process the thermal infrared image data and the non-thermal image data to generate a combined image comprising visible spectrum characteristics of the scene derived from the non-thermal image data and infrared characteristics of the scene derived from the radiometric component of the thermal infrared image data.

12. A method of providing infrared imaging functionality for a mobile user device, the method comprising:
releasably attaching to the mobile user device a device attachment to support mobile operation of the device attachment in conjunction with the mobile user device, the device attachment comprising an infrared sensor assembly, a supplementary component, and a processing module;
capturing thermal infrared image data of a scene at the infrared sensor assembly;
generating sensor data associated with at least a portion of the scene using the supplementary component; and
providing information associated with the thermal infrared image data and/or the sensor data to the mobile user device using the processing module for display by the mobile user device.

13. The method of claim 12, wherein the device attachment comprises a housing comprising a rear wall and at least one sidewall that form a recess configured to receive the mobile user device, wherein the mobile user device is a mobile personal electronic device.

14. The method of claim 12, wherein the device attachment comprises a device connector, the method further comprising:
passing the thermal infrared image data from the processing module to the mobile user device through the device connector.

15. The method of claim 12, further comprising:
generating, using the mobile user device, a request for capturing and transmitting the thermal infrared image data; and
transmitting the request to the device attachment, wherein the thermal infrared image data is captured and transmitted in response to the request.

16. The method of claim 12, further comprising:
detecting a depression of a button provided on the device attachment; and
transmitting a signal to the mobile user device in response to the detected depression of the button.

17. The method of claim 12, wherein:
the infrared sensor assembly comprises a focal plane array (FPA) configured to capture the thermal infrared image data; and
the FPA comprises an array of microbolometers; and
the method further comprises providing a bias voltage to the microbolometers selected from a range of approximately 0.2 volts to approximately 0.7 volts.

18. The method of claim 12, wherein the thermal infrared image data comprises an unblurred image frame, the method further comprising:
capturing an intentionally blurred image frame;
determining a plurality of non-uniform correction (NUC) terms based on the intentionally blurred image frame; and
applying the NUC terms to the unblurred image frame to remove noise from the unblurred image frame.

19. The method of claim 18, wherein the determining and the applying is by a processor of the mobile user device, the device attachment comprises a geo-spatial location sensor, and the method further comprises linking the thermal infrared image data and the sensor data to a location using the geo-spatial location sensor.

20. The method of claim 12, further comprising:
capturing non-thermal image data using a non-thermal camera module.

21. The method of claim 20, wherein the non-thermal camera module and/or the supplementary component is in the device attachment.

22. The method of claim 20, wherein the non-thermal camera module is in the mobile user device.

23. The method of claim 20, further comprising:
combining the thermal infrared image data and the non-thermal image data.

24. The method of claim 20, wherein:
the non-thermal camera module is configured to capture the non-thermal image data from the scene at a first time;
the infrared sensor assembly is configured to capture the thermal infrared image data from the scene at a second time, wherein the thermal infrared image data comprises a radiometric component; and
the method further comprises processing the thermal infrared image data and the non-thermal image data to generate a combined image comprising visible spectrum characteristics of the scene derived from the non-thermal image data and infrared characteristics of the scene derived from the radiometric component of the thermal infrared image data.

* * * * *